(12) United States Patent
Tokutake

(10) Patent No.: US 10,877,609 B2
(45) Date of Patent: Dec. 29, 2020

(54) INFORMATION PROCESSING APPARATUS CONFIGURED TO CONTROL AN APPLICATION BASED ON AN INPUT MODE SUPPORTED BY THE APPLICATION

(71) Applicant: SONY CORPORATION, Tokyo (JP)

(72) Inventor: Kenji Tokutake, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/058,368

(22) Filed: Aug. 8, 2018

(65) Prior Publication Data

US 2019/0025958 A1  Jan. 24, 2019

Related U.S. Application Data

(63) Continuation of application No. 13/588,300, filed on Aug. 17, 2012, now abandoned.
(Continued)

(51) Int. Cl.
*G06F 3/044* (2006.01)
*G06F 3/041* (2006.01)

(52) U.S. Cl.
CPC ........... *G06F 3/044* (2013.01); *G06F 3/0416* (2013.01); *G06F 2203/04108* (2013.01)

(58) Field of Classification Search
CPC .................. G06F 3/044; G06F 3/0416; G06F 2203/04108
See application file for complete search history.

(56) References Cited

U.S. PATENT DOCUMENTS 10,241,627 B2 * 3/2019 Yoon .................. G06F 3/044
2005/0097570 A1 * 5/2005 Bomers .............. G06F 9/545
719/318

(Continued)

FOREIGN PATENT DOCUMENTS

JP  2011-070525  4/2011
JP  2011-172078  9/2011

OTHER PUBLICATIONS

Extended European Search Report dated Jun. 8, 2017, issued in European Application No. 12182413.0, 9 pages.
(Continued)

*Primary Examiner* — Nitin Patel
*Assistant Examiner* — Robert M Stone
(74) *Attorney, Agent, or Firm* — Xsensus LLP

(57) ABSTRACT

[Object] To make information processing based on a given application program operable by contactless operations.
[Solution] A display unit forming a capacitive touch panel is provided. Changes in the capacitance values of respective capacitive sensors in the display unit are detected during a contactless operation, and on the basis of such changes in capacitance values, a contactless operation mode (gesture) of the contactless operation and two-dimensional coordinate information corresponding to the contactless operation mode are detected. Then, execution of information processing corresponding to the detected contactless operation mode and two-dimensional coordinate information from among respective information processing in the currently activated application program is controlled. Thus, information processing in a given application program can be made operable by a contactless operation.

19 Claims, 12 Drawing Sheets

Related U.S. Application Data

(60) Provisional application No. 61/547,783, filed on Oct. 17, 2011.

(56) References Cited

U.S. PATENT DOCUMENTS

| | | | |
|---|---|---|---|
| 2005/0162402 A1* | 7/2005 | Watanachote | G06F 3/03547 345/173 |
| 2005/0229117 A1* | 10/2005 | Hullender | G06F 3/04883 715/863 |
| 2006/0010400 A1* | 1/2006 | Dehlin | G06F 3/0354 715/856 |
| 2006/0022955 A1* | 2/2006 | Kennedy | G06F 3/04883 345/173 |
| 2006/0161871 A1 | 7/2006 | Hotelling et al. | |
| 2006/0267953 A1* | 11/2006 | Peterson, Jr. | G06F 3/0418 345/173 |
| 2006/0267958 A1* | 11/2006 | Kolmykov-Zotov | G06F 9/451 345/173 |
| 2008/0046425 A1* | 2/2008 | Perski | G06F 3/04883 |
| 2008/0055269 A1* | 3/2008 | Lemay | G06F 3/017 345/173 |
| 2008/0158170 A1* | 7/2008 | Herz | G06F 3/0416 345/173 |
| 2009/0066651 A1* | 3/2009 | Griffin | G06F 3/03549 345/167 |
| 2009/0309851 A1* | 12/2009 | Bernstein | G06F 3/0416 345/174 |
| 2010/0107067 A1* | 4/2010 | Vaisanen | G06F 3/04883 715/702 |
| 2010/0229090 A1* | 9/2010 | Newton | G06F 3/0428 715/702 |
| 2010/0242274 A1* | 9/2010 | Rosenfeld | G06F 3/041 29/848 |
| 2010/0245246 A1* | 9/2010 | Rosenfeld | G06F 3/0414 345/163 |
| 2010/0259504 A1* | 10/2010 | Doi | G06F 3/0418 345/174 |
| 2010/0277429 A1* | 11/2010 | Day | G06F 3/041 345/173 |
| 2010/0295781 A1* | 11/2010 | Alameh | G06F 3/017 345/158 |
| 2010/0321315 A1* | 12/2010 | Oda | G06F 3/044 345/173 |
| 2010/0321334 A1* | 12/2010 | Oda | G06F 3/0416 345/174 |
| 2011/0007021 A1 | 1/2011 | Bernstein et al. | |
| 2011/0050629 A1* | 3/2011 | Homma | G06F 3/0488 345/174 |
| 2011/0083110 A1* | 4/2011 | Griffin | G06F 3/04886 715/863 |
| 2011/0093778 A1* | 4/2011 | Kim | G06F 3/041 715/702 |
| 2011/0260970 A1* | 10/2011 | Kuo | G06F 3/0488 345/161 |
| 2011/0312349 A1* | 12/2011 | Forutanpour | G06F 1/1626 455/466 |
| 2012/0054670 A1* | 3/2012 | Rainisto | G06F 3/0485 715/784 |
| 2012/0200513 A1* | 8/2012 | Kim | G06F 1/1626 345/173 |
| 2012/0218192 A1* | 8/2012 | Lazaridis | G06F 1/1626 345/173 |
| 2013/0050151 A1* | 2/2013 | Tu | G06F 3/0416 345/178 |
| 2013/0093719 A1* | 4/2013 | Tokutake | G06F 3/0416 345/174 |
| 2013/0113715 A1* | 5/2013 | Grant | G06F 3/0488 345/173 |
| 2013/0249861 A1* | 9/2013 | Chang | G06F 3/0412 345/174 |
| 2014/0253486 A1* | 9/2014 | Luo | G06F 3/0488 345/173 |
| 2015/0185923 A1* | 7/2015 | Yoon | G06F 3/0416 345/174 |
| 2016/0349871 A1* | 12/2016 | Tanemura | G06F 3/0416 |

OTHER PUBLICATIONS

Combined Office Action and Search Report dated Jan. 6, 2015 in Chinese Patent Application No. 201210365614.0 (with English language translation).

Communication pursuant to Article 94(3) EPC issued in European Application 17 155 041.1-1231 dated Jan. 16, 2020.

* cited by examiner

FIG. 5

| Y\X | 1 | 2 | 3 | 4 | 5 | 6 | 7 | 8 | 9 | 10 |
|---|---|---|---|---|---|---|---|---|---|---|
| 1 | 10 | 8 | 8 | 10 | 7 | 8 | 7 | 9 | 10 | 8 |
| 2 | 8 | 7 | 9 | 7 | 8 | 7 | 8 | 7 | 8 | 8 |
| 3 | 8 | 8 | 10 | 7 | 8 | 7 | 9 | 10 | 8 | 9 |
| 4 | 7 | 8 | 7 | 8 | 7 | 8 | 8 | 10 | 7 | 9 |
| 5 | 7 | 8 | 7 | 10 | 7 | 8 | 7 | 9 | 10 | 8 |
| 6 | 10 | 7 | 8 | 8 | 10 | 7 | 8 | 7 | 9 | 10 |
| 7 | 7 | 9 | 10 | 10 | 7 | 8 | 8 | 8 | 10 | 7 |
| 8 | 7 | 9 | 8 | 10 | 7 | 8 | 7 | 9 | 10 | 8 |
| 9 | 8 | 8 | 8 | 7 | 9 | 10 | 8 | 8 | 10 | 7 |
| 10 | 9 | 10 | 10 | 8 | 8 | 7 | 9 | 10 | 8 | 10 |
| 11 | 8 | 7 | 9 | 9 | 10 | 10 | 8 | 8 | 10 | 7 |
| 12 | 8 | 10 | 7 | 9 | 9 | 8 | 10 | 7 | 9 | 10 |
| 13 | 8 | 7 | 90 | 10 | 8 | 8 | 7 | 9 | 10 | 8 |
| 14 | 7 | 90 | 100 | 90 | 8 | 8 | 10 | 7 | 9 | 9 |
| 15 | 8 | 8 | 90 | 8 | 7 | 8 | 7 | 9 | 10 | 8 |
| 16 | 9 | 10 | 9 | 10 | 8 | 7 | 9 | 10 | 8 | 10 |
| 17 | 8 | 7 | 9 | 10 | 8 | 8 | 7 | 9 | 10 | 8 |
| 18 | 8 | 10 | 7 | 9 | 9 | 7 | 8 | 7 | 9 | 10 |
| 19 | 8 | 7 | 9 | 10 | 8 | 7 | 10 | 8 | 8 | 10 |
| 20 | 8 | 8 | 10 | 7 | 8 | 7 | 9 | 10 | 8 | 9 |

FIG. 6

| Y\X | 1 | 2 | 3 | 4 | 5 | 6 | 7 | 8 | 9 | 10 |
|---|---|---|---|---|---|---|---|---|---|---|
| 1 | 10 | 8 | 8 | 10 | 7 | 8 | 7 | 9 | 10 | 8 |
| 2 | 8 | 7 | 9 | 7 | 8 | 7 | 8 | 7 | 8 | 8 |
| 3 | 8 | 8 | 10 | 7 | 8 | 7 | 9 | 10 | 8 | 9 |
| 4 | 7 | 8 | 7 | 8 | 7 | 8 | 8 | 10 | 7 | 9 |
| 5 | 7 | 8 | 7 | 10 | 7 | 8 | 7 | 9 | 10 | 8 |
| 6 | 10 | 7 | 8 | 8 | 10 | 7 | 8 | 7 | 9 | 10 |
| 7 | 7 | 9 | 10 | 10 | 7 | 8 | 8 | 8 | 10 | 7 |
| 8 | 7 | 9 | 8 | 10 | 7 | 8 | 7 | 9 | 10 | 8 |
| 9 | 8 | 8 | 8 | 7 | 9 | 10 | 8 | 8 | 10 | 7 |
| 10 | 9 | 10 | 10 | 8 | 8 | 7 | 9 | 10 | 8 | 10 |
| 11 | 8 | 7 | 9 | 9 | 10 | 10 | 8 | 8 | 10 | 7 |
| 12 | 8 | 10 | 30 | 9 | 9 | 8 | 10 | 7 | 9 | 10 |
| 13 | 8 | 7 | 40 | 30 | 8 | 8 | 7 | 9 | 10 | 8 |
| 14 | 7 | 30 | 50 | 40 | 30 | 8 | 10 | 7 | 9 | 9 |
| 15 | 8 | 20 | 30 | 40 | 30 | 8 | 7 | 9 | 10 | 8 |
| 16 | 9 | 10 | 20 | 20 | 8 | 7 | 9 | 10 | 8 | 10 |
| 17 | 8 | 7 | 9 | 10 | 8 | 8 | 7 | 9 | 10 | 8 |
| 18 | 8 | 10 | 7 | 9 | 9 | 7 | 8 | 7 | 9 | 10 |
| 19 | 8 | 7 | 9 | 10 | 8 | 7 | 10 | 8 | 8 | 10 |
| 20 | 8 | 8 | 10 | 7 | 8 | 7 | 9 | 10 | 8 | 9 |

INFORMATION PROCESSING APPARATUS CONFIGURED TO CONTROL AN APPLICATION BASED ON AN INPUT MODE SUPPORTED BY THE APPLICATION

CROSS-REFERENCE TO THE RELATED APPLICATION

This application is a continuation of Ser. No. 13/588,300, filed Aug. 17, 2012, claiming priority to U.S. Provisional Application No. 61/547,783, filed Oct. 17, 2011, both of which are herein incorporated by reference in their entirety.

TECHNICAL FIELD

The present invention relates to an ideal information processing apparatus applied to an electronic device provided with an operable unit that detects an operation mode on the basis of changes in the capacitance of an operable surface, such as a touch panel, for example.

Specifically, the present invention relates to an ideal information processing apparatus applied to an electronic device such as a mobile phone, a PHS phone (PHS: Personal Handyphone System), a PDA (PDA: Personal Digital Assistant), a digital camera, a digital video camera, a portable game console, or a notebook computer, for example.

BACKGROUND ART

At present, mobile phones provided with capacitive touch panels are known. In such mobile phones, a controller detects a direct touch operation via the touch panel on the basis of an input processing program. Then, the controller controls execution of a process corresponding to the detected direct touch operation from among various information processes in a given application program.

FIG. 10 illustrates a function block diagram of such a controller realized as a result of a controller acting on the basis of the input processing program.

As illustrated in FIG. 10, in the case of acting on the basis of the input processing program, the controller functions as a two-dimensional coordinate converter 101 which detects a direct touch operation position on a touch panel 100 and outputs two-dimensional coordinate information (X coordinate information and Y coordinate information) corresponding to the direct touch operation position.

Herein, in the case of functioning as the two-dimensional coordinate converter 101, the controller may also create two-dimensional coordinate information corresponding to a direct touch operation position on the basis of output from the touch panel 100, which is hardware (HW) as discussed above. Alternatively, before functioning as the two-dimensional coordinate converter 101, the controller may function as firmware (FW) which detects two-dimensional coordinate information corresponding to a direct touch operation position on the basis of output from the hardware (HW) touch panel 100, and subsequently function as the two-dimensional coordinate converter 101 and create two-dimensional coordinate information corresponding to the direct touch operation position.

Also, in the case of acting on the basis of the input processing program, the controller functions as an operation detector 104 in a window manager 102 which detects a direct touch operation position and a direct touch operation state (direct touch operation mode) on the basis of the two-dimensional coordinate information created when the controller functions as the two-dimensional coordinate converter 101.

Then, the controller functions as an application execution controller 103 that controls execution of information processing which, from among the various information processing of a currently activated application program, corresponds to a direct touch operation state, etc. detected when the controller functions as the operation detector 104 of the window manager 102.

FIG. 11 illustrates a flowchart of a controller's input processing action based on the input processing program. The touch panel 100 is configured to identify an operation position by detecting changes in the capacitance between a user's finger and the conductive film 151 of the two-dimensional coordinate converter 101, as illustrated in FIG. 12($a$).

In step S100 of the flowchart in FIG. 11, the controller acquires (scans) the capacitance values of all sensors on the touch panel 100 by functioning as the two-dimensional coordinate converter 101. Also, in step S100 the controller determines whether or not capacitance values have been detected for all sensors on the touch panel 100, and advances the process to step S101 when capacitance values have been detected for all sensors.

If the user performs a direct touch operation with his or her finger on the conductive film 151 forming the operable surface of the touch panel 100, a change in capacitance values occurs centered about the direct touch operation position on the conductive film 151, as illustrated in FIG. 12($b$). In other words, in the case where a direct touch operation is conducted on the touch panel 100, the capacitance values change such that the approximate center of the direct touch operation position on the conductive film 151 becomes the peak value of the capacitance values, with the capacitance values gradually becoming smaller away from the center of the direct touch operation position.

In step S101 the controller, by functioning as the two-dimensional coordinate converter 101, compares the capacitance values of the individual sensors to a direct touch threshold level as illustrated in FIG. 12($b$), and determines whether or not there exist sensors among all sensors on the touch panel 100 having capacitance values equal to or greater than the direct touch threshold level.

In the case where it is determined that sensors having capacitance values equal to or greater than the direct touch threshold level do not exist, the controller advances the process to step S104 and determines whether or not to continue detecting the capacitance values of the respective sensors. Then, in the case where it is determined not to continue detecting the capacitance values of the respective sensors, the controller ends the process of the flowchart in FIG. 11. Meanwhile, in the case where it is determined to continue detecting the capacitance values of the respective sensors, the controller returns the process to step S100 at the timing for conducting the next detection of the capacitance values of the respective sensors and acquires the capacitances value of the respective sensors again.

In contrast, in the case where it is determined in step S101 that there do exist sensors having capacitance values equal to or greater than the direct touch threshold level, the controller advances the process to step S102, identifies the sensors having capacitance values equal to or greater than the direct touch threshold level, and advances the process to step S103.

Then, in step S103 the controller creates two-dimensional coordinate information (i.e., respective X-axis and Y-axis coordinate information) corresponding to the placement positions on the touch panel 100 of the identified sensors having capacitance values equal to or greater than the direct touch threshold level, controls storage of the two-dimensional coordinate information to a register, and advances the process to step S104.

The controller is configured to control storage of two-dimensional coordinate information thus created to a register every time the capacitance values of respective sensors are acquired from the touch panel 100 and the two-dimensional coordinate information is created. For this reason, respective sets of two-dimensional coordinate information in accordance with direct touch operations on the touch panel 100 by the user are successively stored in the register. Consequently, direct touch operation history information (i.e., the respective sets of two-dimensional coordinate information) corresponding to direct touch operations on the touch panel 100 by the user is stored in the register.

When functioning as the operation detector 104 of the window manager 102, the controller detects the user's direct touch operation mode, like that illustrated in FIG. 12(c) for example, on the basis of the direct touch history given by the respective sets of two-dimensional coordinate information stored in the register.

Then, when functioning as the application execution controller 103, the controller controls execution of information processing which, from among the various information processing of a currently activated application program, corresponds to the detected direct touch operation mode and the two-dimensional coordinate information used when detecting the direct touch operation mode.

By determining to continue detecting capacitance values in step S104 and returning the process to step S100, the controller acquires the capacitance values of the respective sensors in the touch panel 100 at given time intervals, and conducts processing for creating the two-dimensional coordinate information, detecting the direct touch operation mode, and executing an application program based on the detected operation mode, etc., on the basis of the acquired capacitance values.

CITATION LIST

Patent Literature

[PTL 1] Japanese Unexamined Patent Application Publication No. 2011-172078
[PTL 2] Japanese Unexamined Patent Application Publication No. 2011-70525

SUMMARY OF INVENTION

Technical Problem

By performing a direct touch operation on the touch panel 100 with an operating object such as a finger as discussed above, information processing operations based on the currently activated application program become possible.

However, the Inventor of the present invention has recognized the need for an information processing apparatus in which information processing in a given application program is operable not only by direct touch operations, but also by contactless operations.

Solution to Problem

According to an embodiment of the present invention, there is provided an information processing apparatus including a determining unit that determines whether or not an activated application program supports contactless operations in which an operating object operates on a capacitive operable surface without touching it, an operation detector wherein, in the case where it is determined by the determining unit that the activated application program supports contactless operations, the operation detector detects whether an operation performed while the application program is running is a direct touch operation in which a touching object operates on the capacitive operable surface by touching it, or a contactless operation in which the operating object operates on the operable surface without touching it, and a controller provided with a first control mode that controls execution of a process in an application program according to the direct touch operation, and a second control mode that controls execution of a process in an application program according to the direct touch operation and the contactless operation, and wherein in the case where it is determined by the determining unit that the activated application program does not support contactless operations, the controller switches to the first control mode and controls execution of a process in the activated application program according to the direct touch operation, whereas in the case where it is determined by the determining unit that the activated application program supports contactless operations, the controller switches to the second control mode and controls execution of a process in the activated application program according to the direct touch operation or the contactless operation detected by the operation detector.

Also, according to an embodiment of the present invention, there is provided an information processing apparatus wherein the operation detector detects capacitance values of the operable surface, such that the direct touch operation is detected as having been performed in the case where the detected capacitance values are equal to or greater than a direct touch threshold level, whereas the contactless operation is detected as having been performed in the case where the detected capacitance values are lower than the direct touch threshold level but also equal to or greater than a contactless threshold level.

Also, according to an embodiment of the present invention, there is provided an information processing apparatus wherein in the case where the controller has switched to the first control mode, the operable surface being directly touched causes the controller to detect two-dimensional coordinate information corresponding to places on the operable surface where the capacitance values have become equal to or greater than the direct touch threshold level, and the controller controls execution of a process in the application program corresponding to the direct touch operation on the basis of the detected two-dimensional coordinate information, and in the case where the controller has switched to the second control mode, while the direct touch operation is detected by the operation detector, the controller detects two-dimensional coordinate information corresponding to places on the operable surface where the capacitance values have become equal to or greater than the direct touch threshold level and controls execution of a process in an application program corresponding to the direct touch operation on the basis of the detected two-dimensional coordinate information, whereas while the contactless operation is detected by the operation detector, the controller compares a transition pattern of two-dimensional coordinates corresponding to places on the operable surface where the capacitance values have become values which are less than the direct touch threshold level but also equal to or greater than the contactless threshold level to information which is respectively attached to the activated application program and which expresses transition patterns in the two-dimensional coordinates corresponding to respective processes in the application program, as well as to two-dimensional coordinate information corresponding to respective processes in the application program, and by comparing these the controller detects a process in the application program corresponding to the contactless operation and two-dimensional coordinate information corresponding to this process in the application program, and controls execution of the process in the application program on the basis of the detected two-dimensional coordinate information.

Also, according to an embodiment of the present invention, there is provided an information processing apparatus wherein the application program is a telephone application program that conducts telephony by transmitting and receiving audio information, when an incoming telephone call is received and the controller has detected a contactless operation corresponding to an off-hook operation, the controller switches to a hands-free telephony mode on the basis of the telephone application program, controls driving of a microphone unit which picks up telephone transmitter audio and an external speaker unit for obtaining the acoustic output of telephone receiver audio, while also controlling communication by a communication unit so as to transmit and receive telephony audio obtained thereby, and when an incoming telephone call is received and the controller has detected a direct touch operation corresponding to an off-hook operation, the controller switches to a normal telephony mode on the basis of the telephone application program, controls driving of a microphone unit which picks up telephone transmitter audio and an internal speaker unit for obtaining the acoustic output of telephone receiver audio, while also controlling communication by a communication unit so as to transmit and receive telephony audio obtained thereby.

Also, according to an embodiment of the present invention, there is provided an information processing apparatus wherein the application program is a video phone application program that conducts telephony by transmitting and receiving audio information together with image information, and when an incoming video phone call is received and the controller has detected a contactless operation or a direct touch operation corresponding to an off-hook operation, the controller switches to a hands-free telephony mode on the basis of the video phone application program, controls driving of a microphone unit which picks up telephone transmitter audio, an external speaker unit for obtaining the acoustic output of telephone receiver audio, a transmitter image creation unit for obtaining transmitter images, and a display unit for displaying receiver images, while also controlling communication by a communication unit so as to transmit and receive telephony audio and images obtained thereby.

Also, according to an embodiment of the present invention, there is provided an information processing apparatus wherein the application program is a mail application program that transmits and receives email, and when an incoming email is received and the controller has detected a given contactless operation, the controller controls display of the received email on a display unit on the basis of the mail application program, and when the controller has detected another given contactless operation, the controller controls scrolling of the email displayed on the display unit.

Also, according to an embodiment of the present invention, there is provided an information processing apparatus wherein the application program is a lock/unlock application program for realizing an unlocked mode which accepts operations on the operable surface and executes actions according to the operations, and a locked mode which cancels operations on the operable surface, and while in the locked mode, the controller switches from the locked mode to the unlocked mode when a given contactless operation is detected.

Also, according to an embodiment of the present invention, there is provided an information processing apparatus wherein the application program is a display magnification modification application program which modifies the display magnification of display objects being displayed on a display unit, or a display position modification application program which modifies the display position of display objects being displayed on a display unit, in the case where the application program is the display magnification modification application program, when a given contactless operation is detected, the controller controls display of display objects being displayed on the display unit at an enlargement ratio corresponding to the contactless operation, and when another given contactless operation is detected, the controller controls display of display object being displayed on the display unit at a reduction ration corresponding to the contactless operation, and in the case where the application program is the display position modification application program, when a given contactless operation is detected, the controller scrolls up display objects being displayed on the display unit at a speed corresponding to the contactless operation, and when another given contactless operation is detected, the controller scrolls down display objects being displayed on the display unit at a speed corresponding to the contactless operation.

Also, according to an embodiment of the present invention, there is provided an information processing method including a determining step that determines whether or not an activated application program supports contactless operations in which an operating object operates on a capacitive operable surface without touching it, an operation detecting step wherein, in the case where it is determined in the determining step that the activated application program supports contactless operations, the operation detecting step detects whether an operation performed while the application program is running is a direct touch operation in which a touching object operates on the capacitive operable surface by touching it, or a contactless operation in which the operating object operates on the operable surface without touching it, and a controlling step provided with a first control mode that controls execution of a process in an application program according to the direct touch operation, and a second control mode that controls execution of a process in an application program according to the direct touch operation and the contactless operation, and wherein in the case where it is determined in the determining step that the activated application program does not support contactless operations, the controlling step switches to the first control mode and controls execution of a process in the activated application program according to the direct touch operation, whereas in the case where it is determined in the determining step that the activated application program supports contactless operations, the controlling step switches to the second control mode and controls execution of a process in the activated application program according to the direct touch operation or the contactless operation detected by the operation detector.

Also, according to an embodiment of the present invention, there is provided an information processing program that causes a computer to function as a determining unit that determines whether or not an activated application program supports contactless operations in which an operating object operates on a capacitive operable surface without touching it, causes the computer to function as an operation detector wherein, in the case where it is determined by the determining unit that the activated application program supports contactless operations, the operation detector detects whether an operation performed while the application program is running is a direct touch operation in which a touching object operates on the capacitive operable surface by touching it, or a contactless operation in which the operating object operates on the operable surface without touching it, and causes the computer to function as a controller provided with a first control mode that controls execution of a process in an application program according to the direct touch operation, and a second control mode that controls execution of a process in an application program according to the direct touch operation and the contactless operation, and wherein in the case where it is determined by the determining unit that the activated application program does not support contactless operations, the controller switches to the first control mode and controls execution of a process in the activated application program according to the direct touch operation, whereas in the case where it is determined by the determining unit that the activated application program supports contactless operations, the controller switches to the second control mode and controls execution of a process in the activated application program according to the direct touch operation or the contactless operation detected by the operation detector.

Also, according to an embodiment of the present invention, there is provided a storage medium storing an information processing program that causes a computer to function as a determining unit that determines whether or not an activated application program supports contactless operations in which an operating object operates on a capacitive operable surface without touching it, causes the computer to function as an operation detector wherein, in the case where it is determined by the determining unit that the activated application program supports contactless operations, the operation detector detects whether an operation performed while the application program is running is a direct touch operation in which a touching object operates on the capacitive operable surface by touching it, or a contactless operation in which the operating object operates on the operable surface without touching it, and causes the computer to function as a controller provided with a first control mode that controls execution of a process in an application program according to the direct touch operation, and a second control mode that controls execution of a process in an application program according to the direct touch operation and the contactless operation, and wherein in the case where it is determined by the determining unit that the activated application program does not support contactless operations, the controller switches to the first control mode and controls execution of a process in the activated application program according to the direct touch operation, whereas in the case where it is determined by the determining unit that the activated application program supports contactless operations, the controller switches to the second control mode and controls execution of a process in the activated application program according to the direct touch operation or the contactless operation detected by the operation detector.

Also, according to an embodiment of the present invention, there is provided a mobile device including a determining unit that determines whether or not an activated application program supports contactless operations in which an operating object operates on a capacitive operable surface without touching it, an operation detector wherein, in the case where it is determined by the determining unit that the activated application program supports contactless operations, the operation detector detects whether an operation performed while the application program is running is a direct touch operation in which a touching object operates on the capacitive operable surface by touching it, or a contactless operation in which the operating object operates on the operable surface without touching it, and a controller provided with a first control mode that controls execution of a process in an application program according to the direct touch operation, and a second control mode that controls execution of a process in an application program according to the direct touch operation and the contactless operation, and wherein in the case where it is determined by the determining unit that the activated application program does not support contactless operations, the controller switches to the first control mode and controls execution of a process in the activated application program according to the direct touch operation, whereas in the case where it is determined by the determining unit that the activated application program supports contactless operations, the controller switches to the second control mode and controls execution of a process in the activated application program according to the direct touch operation or the contactless operation detected by the operation detector.

Advantageous Effects of Invention

According to an embodiment of the present invention, new operation modes can be provided in which information processing in a given application program is operable by contactless operations.

BRIEF DESCRIPTION OF DRAWINGS

FIG. 5 is a diagram illustrating exemplary capacitance values of respective sensors during a direct touch operation in a mobile phone according to an embodiment.

FIG. 6 is a diagram illustrating exemplary capacitance values of respective sensors during an contactless operation in a mobile phone according to an embodiment.

FIGS. 8A, 8B and 8C are diagrams illustrating an exemplary transition pattern across capacitance maps during a contactless operation in a mobile phone according to an embodiment.

DESCRIPTION OF EMBODIMENTS

The present invention can be applied to a mobile phone as one example.

Configuration of Mobile Phone

Figure 1:
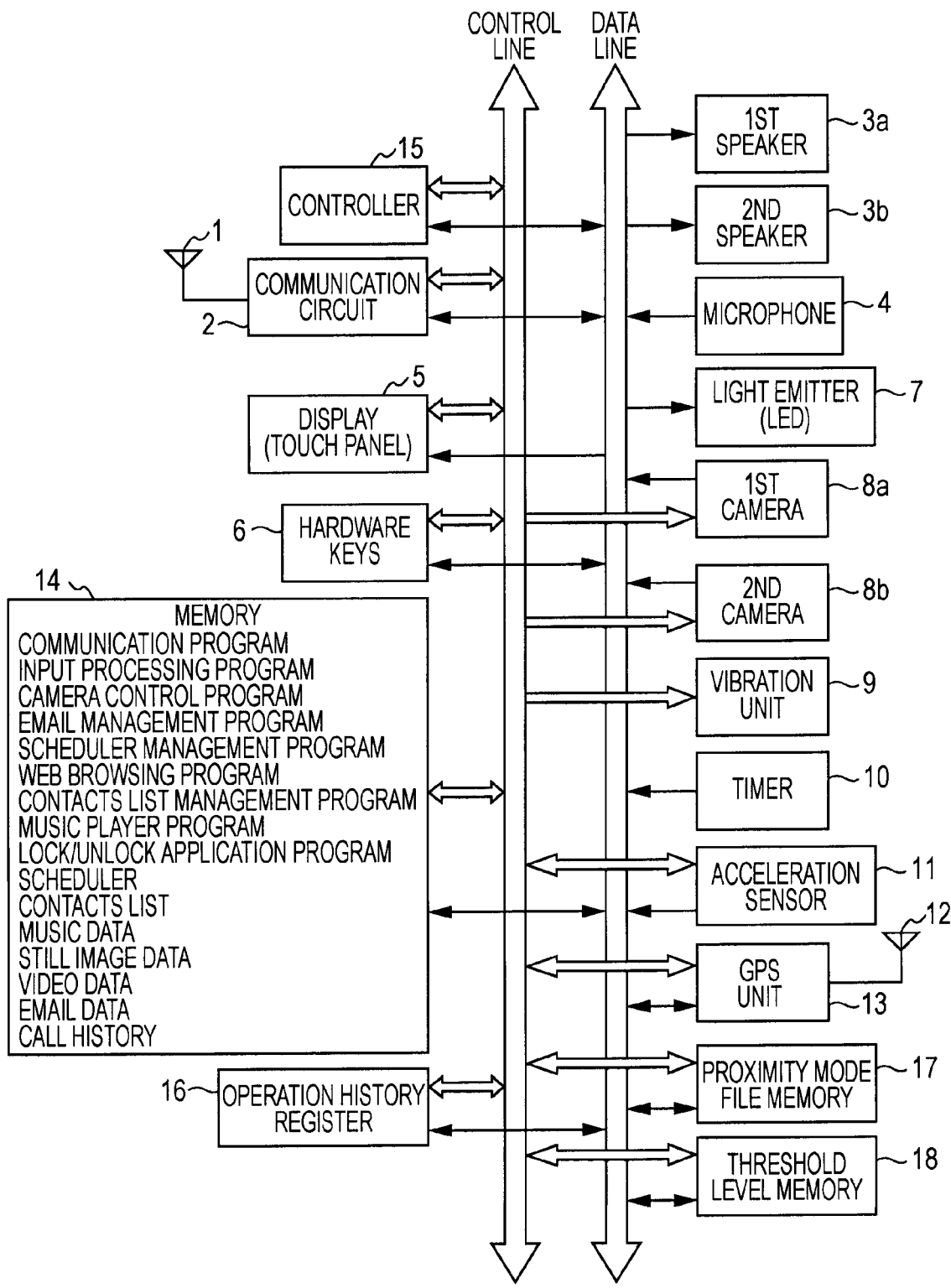
FIG. 1 is a block diagram of a mobile phone according to an embodiment implementing the present invention.

FIG. 1 is a block diagram of a mobile phone according to an embodiment of the present invention. As illustrated in FIG. 1, a mobile phone according to an embodiment includes an antenna 1 and a communication circuit 2 which conduct audio telephony, video telephony, and wireless communication such as email and Web data (Web: World Wide Web) with a base station.

Also, the mobile phone includes a first speaker unit 3a (internal speaker unit) for obtaining acoustic output such as telephone receiver audio at a volume hearable when the mobile phone is brought close to the ear, as well as a second speaker unit 3b (external speaker unit) for obtaining acoustic output such as telephone receiver audio in cases where the mobile phone is used at a position distanced from the user's ear, such as during hands-free telephony or during video telephony.

The mobile phone also includes a microphone unit 4 for picking up telephone transmitter audio, etc., a display unit 5 forming what is called a touch panel for performing direct touch operations and contactless operations thereon, and a plurality of hardware keys 6 physically provided on the chassis of the mobile phone.

The mobile phone also includes a light emitter 7 (LED: Light Emitting Diode) for notifying the user of incoming/outgoing signals, etc. with light, a first camera unit 8a for shooting a still image or video of a desired subject, and a second camera unit 8b for shooting the user, etc. of the mobile phone during video telephony, for example.

The mobile phone also includes a vibration unit 9 for notifying the user of incoming/outgoing signals, etc. by causing the chassis of the mobile phone to vibrate, and a timer 10 that keeps the current time.

The mobile phone also includes an acceleration sensor 11 for detecting shake operations, etc. imparted to the chassis of the mobile phone, as well as a GPS antenna 12 (GPS: Global Positioning System) and a GPS unit 13 for detecting the present location of the mobile phone and the shooting location of still images or videos shot primarily with the first camera unit 8a.

The mobile phone also includes memory 14 storing a communication program for conducting the wireless communication processing via a base station and various application programs in addition to various data handled by these various application programs, and a controller 15 that controls overall action of the mobile phone.

The mobile phone also includes an operation history register 16 that stores a capacitance map which indicates the capacitance values of all sensors in the display unit 5 forming the touch panel.

The operation history register 16 includes a storage area for direct touch operations and a storage area for contactless operations. It is configured such that direct touch operation positions and direct touch operation-induced capacitance values corresponding to direct touch operations by the user are successively stored in the storage area for direct touch operations in the operation history register 16.

It is also configured such that capacitance values corresponding to contactless operations by the user are successively stored in the storage area for contactless operations in the operation history register 16.

The mobile phone also includes contactless operation mode file memory 17 storing contactless operation mode files for detecting contactless operation modes (contactless operation patterns) for respective contactless operations.

In the case of the mobile phone in this embodiment, an application program that allows contactless operations includes a contactless operation mode file in which contactless operation mode data corresponding to various processes in the application program is stored as a file.

In other words, the contactless operation mode data is data expressing transition patterns on the capacitance map for respective contactless operation modes corresponding to respective processes in the application program. Furthermore, in the contactless operation mode file, contactless operation mode data for the respective contactless operation modes is formed as a file.

Stated differently, in the case of the mobile phone in this embodiment, an application program that allows contactless operations includes a contactless operation mode file, in which the capacitance map transition patterns for each of the contactless operations corresponding to respective processes in that application program are stored in a file as the contactless operation mode data.

The controller 15 reads out a contactless operation mode file attached to the application program at given timings, such as when activating the application program, for example, and loads it into the contactless operation mode file memory 17.

The controller 15 compares a capacitance map transition pattern detected during a contactless operation to the capacitance map transition patterns expressed by the respective contactless operation mode data in the contactless operation mode file for that application program which was loaded into the contactless operation mode file memory 17, and detects the contactless operation mode. It is configured such that the controller 15 then controls execution of a process corresponding to the detected contactless operation mode on the basis of the activated application program.

Next, the mobile phone in this embodiment includes threshold level memory 18 in which the direct touch threshold level and the contactless threshold level are respectively stored.

The controller 15 is provided with a first control mode that controls execution of processes in an application program according to direct touch operations, and a second control mode that controls execution of processes in an application program according to direct touch operations and contactless operations.

Additionally, in the case where it is determined that the activated application program does not support contactless operations, the controller 15 switches to the first control mode and controls execution of processes in the activated application program according to direct touch operations detected on the basis of the direct touch threshold level stored in the threshold level memory 18.

Meanwhile, in the case where it is determined that the activated application program does support contactless operations, the controller 15 switches to the second control mode and controls execution of processes in the activated application program according to direct touch operations detected on the basis of the direct touch threshold level stored in the threshold level memory 18, while also controlling execution of processes in the activated application program according to contactless operations detected on the basis of the contactless threshold level stored in the threshold level memory 18.

Next, in addition to the communication program, an input processing program for conducting information processing of direct touch operations and contactless operations on the display unit 5 forming the touch panel (input processing) is stored in the memory 14.

Also stored in the memory 14 is a camera control program for controlling the shooting of still images or video with the respective camera units 8a and 8b. The camera control program is provided with a viewer program for displaying shot still images on the display unit 5, etc. The viewer program is provided with functions for changing the display magnification by enlarging or reducing the displayed image, and facial recognition functions for detecting facial images of subjects (persons) appearing in still images.

The camera control program is also provided with a video playback program for displaying shot videos on the display unit 5, etc. Also, the video playback program is provided with playback speed modification functions for controlling changes to the video playback speed.

Also stored in the memory 14 are an email management program for controlling the creation and transmitting/receiving of email, and a scheduler management program for managing a scheduler in which the user's schedule is registered.

Also stored in the memory 14 are a Web browsing program for viewing Web pages by transmitting/receiving information by accessing a server provided on a given network such as a communication network or the Internet, a contacts list management program for managing a contacts list that registers personal information such as the names, addresses, telephone numbers, email addresses, and facial photos of friends and acquaintances (i.e., the contacts list is a personal information registration area), and a music player program for playing back music data.

Also stored in the memory 14 is a lock/unlock application program for realizing an unlocked mode that receives direct touch operations and contactless operations on the display unit 5 and executes actions according to the operations, as well as a locked mode that cancels direct touch operations and contactless operations on the display unit 5.

Also stored in the memory 14 is a scheduler in which the user's desired schedule is registered (i.e., a schedule data registration area), and a contacts list in which information such as the user names, still images (facial images, etc.), addresses, telephone numbers, email addresses, and birthdates of the user's friends and acquaintances is registered (i.e., a personal information registration area for respective users).

Also stored in the memory 14 are music data played back by the music player program, still image data and video data played back by the viewer program and video playback program in the camera control program, transmitted/received email data, and a history of transmitted/received telephone calls and emails.

A projected capacitive touch panel is provided as the touch panel of the display unit 5.

The projected capacitive touch panel includes a resistive film with an electrode layer underneath, as well as a substrate layer provided with a control IC (control integrated circuit). In the electrode layer underneath the resistive film, many electrode patterns forming a mosaic consisting of two layers (horizontal and vertical) are arranged on a glass, plastic, or other substrate using transparent electrodes such as indium tin oxide (ITO).

The projected capacitive touch panel identifies an operation position by detecting changes in electrode capacitance due to a direct touch operation or a contactless operation from two (horizontal and vertical) electrode lines. By respectively providing many electrode lines in the horizontal and vertical directions, multipoint detection of direct touch operations becomes possible.

Although a projected capacitive touch panel is provided as the display unit 5 in this example, what is called a surface capacitive touch panel may also be provided instead of the projected capacitive touch panel.

Function Block Configuration

By acting on the basis of an input processing program stored in the memory 14, the controller 15 of the mobile phone detects a "direct touch operation" made by causing a finger or other operating element (conductive member) to contact the operable surface of the display unit 5 which forms a projected capacitive touch panel.

The mobile phone is also configured to detect a "contactless operation" in which a finger or other conductive member is moved over the operable surface of the display unit 5 such that the distance between the operable surface of the display unit 5 and the finger is short enough to cause at least a given change in the capacitance of the display unit 5, but without the finger directly touching the operable surface.

The controller 15 is also provided with a "first control mode" that controls execution of processes in an application program according to direct touch operations, and a "second control mode" that controls execution of processes in an application program according to both direct touch operations and contactless operations.

Additionally, in the case where it is determined that the activated application program does not support contactless operations, the controller 15 switches to the first control mode and controls execution of processes in the activated application program according to direct touch operations detected on the basis of the direct touch threshold level stored in the threshold level memory 18.

Meanwhile, in the case where it is determined that the activated application program does support contactless operations, the controller 15 switches to the second control mode and controls execution of processes in the activated application program according to direct touch operations detected on the basis of the direct touch threshold level stored in the threshold level memory 18, while also controlling execution of processes in the activated application program according to contactless operations detected on the basis of the contactless threshold level stored in the threshold level memory 18.

Figure 2:
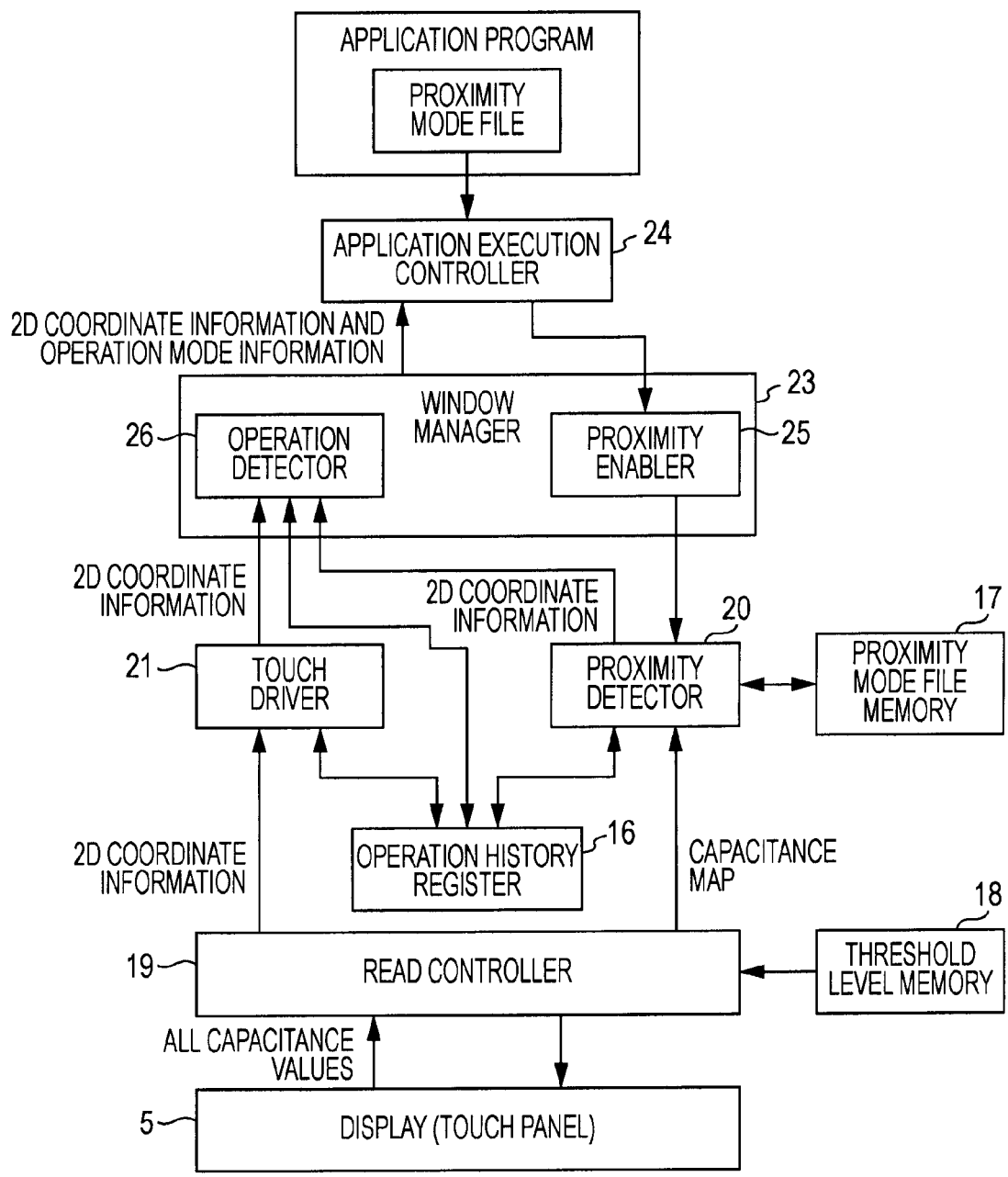
FIG. 2 is a function block diagram during input processing by a controller in a mobile phone according to an embodiment.

FIG. 2 illustrates function blocks of the controller 15 which are realized by the controller 15 acting on the basis of the input processing program.

When acting on the basis of the input processing program, the controller 15 switches to the first control mode in the case where a contactless operation mode file discussed earlier is not attached to the activated application program.

Upon switching to the first control mode, the controller 15 functions as the read controller 19 illustrated in FIG. 2, reads out the capacitance values of all capacitive sensors in the display unit 5, and compares the respective capacitance values to the direct touch threshold level stored in the threshold level memory 18. In so doing, the controller 15 creates two-dimensional coordinate information for the display unit 5 corresponding to the position and number of direct touches by the user (i.e., the number of fingers in a direct touch operation).

Also, upon switching to the first control mode, the controller 15 functions as a touch driver 21, and stores two-dimensional coordinate information corresponding to the detected direct touch operation in the storage area for direct touch operations in the operation history register 16. upon switching to the first control mode, the controller 15 functions as an operation detector 26 of a window manager 23, and detects a direct touch operation mode (direct touch operation pattern) and a direct touch operation position on the basis of the two-dimensional coordinate information corresponding to the direct touch operation acquired when the controller 15 functioned as the touch driver 21, as well as two-dimensional coordinate information obtained during past direct touch operations being stored in the storage area for direct touch operations in the operation history register 16.

Additionally, in the first control mode, the controller 15 functions as an application execution controller 24, and controls execution of a process from among respective processes in the currently active application program that corresponds to the detected direct touch operation mode (direct touch operation pattern) and direct touch operation position.

In contrast, when acting on the basis of the input processing program, the controller 15 switches to the second control mode in the case where a contactless operation mode file discussed earlier is attached to the activated application program.

Upon switching to the second control mode, the controller 15 functions as a contactless operation enabler 25 of the window manager 23, and reads the contactless operation mode file attached to the activated application program. Then, the controller 15 functions as a contactless operation detector 20, and loads the contactless operation mode file read above into the contactless operation mode file memory 17.

Also, upon switching to the second control mode, the controller 15 functions as the read controller 19, reads out the capacitance values of all capacitive sensors in the display unit 5, and by comparing the respective capacitance values to the direct touch threshold level and the contactless threshold level stored in the threshold level memory 18, determines whether a direct touch operation or a contactless operation has been performed by the user. Then, in the case where it is determined that a direct touch operation has been performed by the user, the controller 15 functions as the read controller 19 to create two-dimensional coordinate information for the display unit 5 corresponding to the position and number of direct touches by the user (i.e., the number of fingers in a direct touch operation) as discussed earlier, on the basis of the capacitance values for all capacitive sensors that were read out from the display unit 5 as well as the direct touch threshold level stored in the threshold level memory 18.

Also, in the second control mode, the controller 15 functions as the touch driver 21, and stores two-dimensional coordinate information corresponding to the detected direct touch operation in the storage area for direct touch operations in the operation history register 16.

Also, in the second control mode, the controller 15 functions as the operation detector 26 of the window manager 23, and detects a direct touch operation mode (direct touch operation pattern) and a direct touch operation position on the basis of the two-dimensional coordinate information corresponding to the direct touch operation acquired when the controller 15 functioned as the touch driver 21, as well as two-dimensional coordinate information obtained during past direct touch operations being stored in the storage area for direct touch operations in the operation history register 16.

Additionally, in the second control mode, the controller 15 functions as the application execution controller 24, and controls execution of a process from among the respective processes in the currently active application program that corresponds to the detected direct touch operation mode (direct touch operation pattern) and direct touch operation position.

Also, in the second control mode, in the case where the controller 15 functions as the read controller 19 and thereby determines that a contactless operation has been performed by the user, the controller 15 functions as the contactless operation detector 20, creates a capacitance map indicating the capacitance values of all capacitive sensors that have been read out from the display unit 5, and controls storage of it in the storage area for contactless operations in the operation history register 16.

Also, in the second control mode, the controller 15 functions as the contactless operation detector 20, and detects the contactless operation mode (contactless operation pattern) of the contactless operation performed by the user on the basis of a plurality of capacitance maps stored in the operation history register 16. Then, the controller 15 functions as the contactless operation detector 20, and on the basis of the contactless operation file stored in the contactless operation mode file memory 17, creates two-dimensional coordinate information corresponding to the process from among respective processes in the activated application program for the contactless operation pattern that has been detected on the basis of the plurality of capacitance maps.

Also, in the second control mode, the controller 15 functions as the operation detector 26 of the window manager 23, and identifies the contactless operation mode (contactless operation pattern) and contactless operation position on the basis of the created two-dimensional coordinate information.

Then, in the second control mode, the controller 15 functions as the application execution controller 24, and controls execution of a process from among respective processes in the currently active application program that corresponds to the identified contactless operation mode (contactless operation pattern) and contactless operation position.

Input Processing Action

Figure 3:
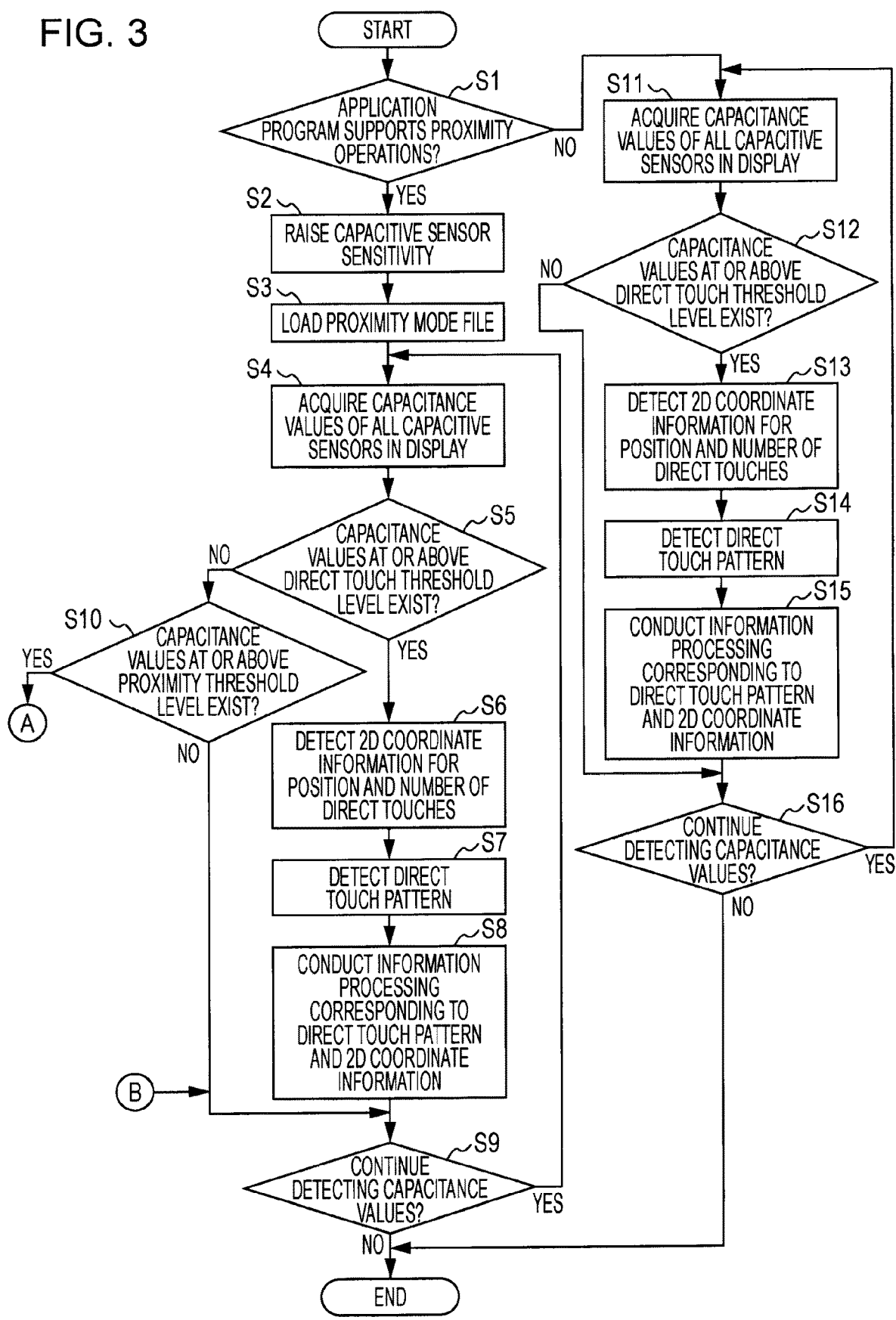
FIG. 3 is a flowchart illustrating input processing action in a mobile phone according to an embodiment.

FIG. 3 illustrates a flowchart of input processing action by the controller 15 based on the input processing program. When an application program is activated, the controller 15 starts the process illustrated by the flowchart in FIG. 3 on the basis of an input processing program stored in the memory 14.

Among the application programs executed in the mobile phone in this embodiment, application programs able to support contactless operations keep information indicating contactless operation modes (gestures) corresponding to respective information processing as a file. For this reason, when such an application program is activated, in step S1 the controller 15 functions as the application execution controller 24 and determines whether or not the activated application program has a contactless operation mode file, thereby determining whether or not the activated application program is able to support contactless operations.

In the case where a contactless operation mode file is not attached to the activated application program, the controller 15 switches to the first control mode and executes the processing from step S11 to step S16.

Figure 7:
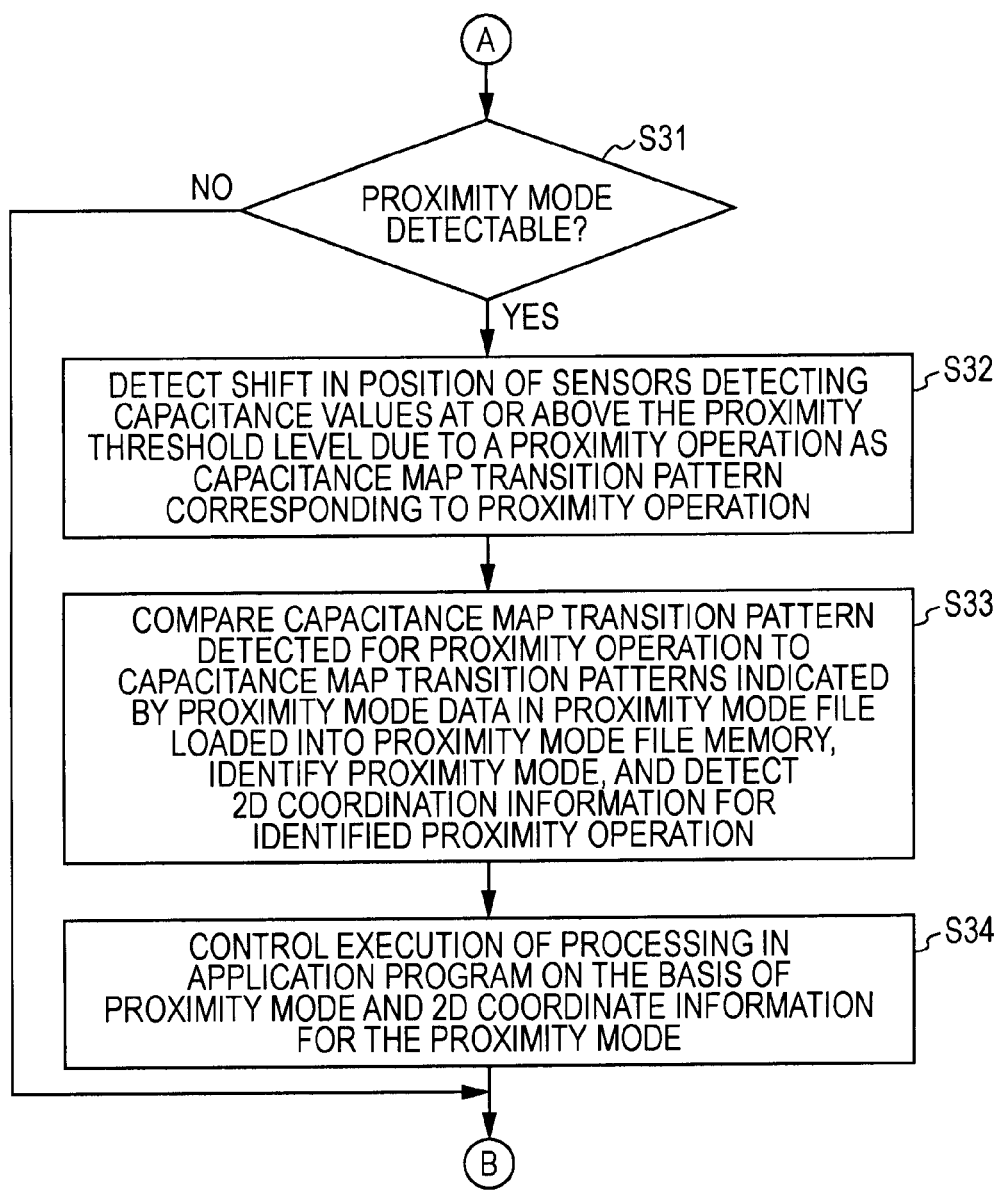
FIG. 7 is a flowchart for explaining action for creating two-dimensional coordinate information for a contactless operation in a mobile phone according to an embodiment.

In contrast, in the case where a contactless operation mode file is attached to the activated application program, the controller 15 switches to the second control mode and executes the processing from step S2 to step S10 as well as the processing from step S31 to step S34 in the flowchart in FIG. 7.

Action During First Control Mode

First, if the controller 15 switches to the first control mode because a contactless operation mode file is not attached to the activated application program, the controller 15 advances the process to step S11, acquires the capacitance values of all capacitive sensors in the display unit 5 by functioning as the read controller 19, and advances the process to step S12.

Figure 4A:
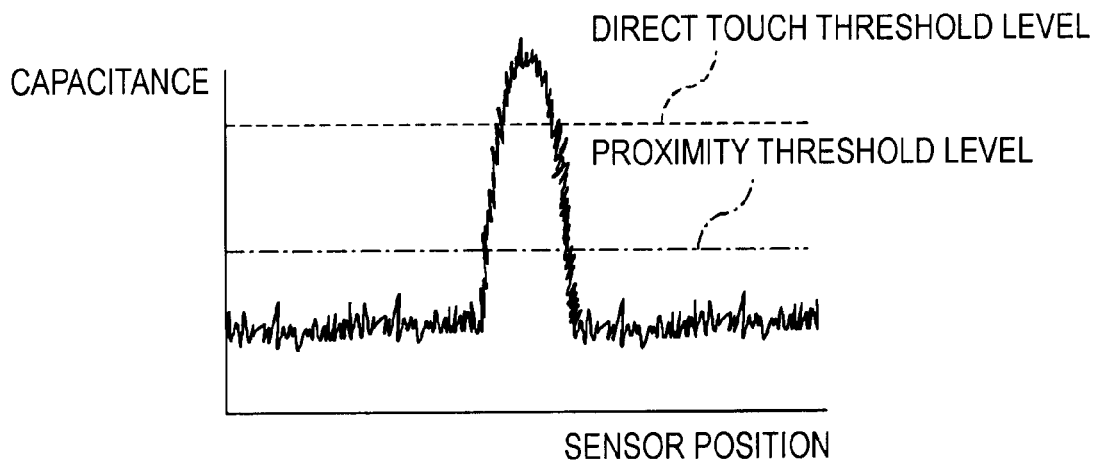
FIGS. 4A, 4B and 4C are diagrams for explaining a direct touch threshold level and a contactless threshold level provided in a mobile phone according to an embodiment.

In step S12, the controller 15 compares the acquired capacitance values to a direct touch threshold level indicated by the broken line in FIG. 4(a) which is stored in the threshold level memory 18. In so doing, the controller 15 determines whether or not there exist capacitive sensors that detected capacitance values equal to or greater than the direct touch threshold level. Then, the controller 15 advances the process to step S13 in the case where it is determined that there do exist capacitive sensors that detected capacitance values equal to or greater than the direct touch threshold level, and advances the process to step S16 in the case where it is determined that there do not exist capacitive sensors that detected capacitance values equal to or greater than the direct touch threshold level.

In the case of the mobile phone in this embodiment, the capacitance values of all capacitive sensors in the display unit 5 are acquired at given time intervals while an application program is being executed. For this reason, if the controller 15 advances the process to step S16 due to determining that there do not exist capacitive sensors that detected capacitance values equal to or greater than the direct touch threshold level, the controller 15 functions as the read controller 19 and determines whether or not an application program is currently running. In so doing, the controller 15 determines whether or not to continue detecting capacitance values.

Then, in cases where it is determined that acquisition of capacitance values has been terminated, such as when an operation for ending the currently active application is performed, for example, the controller 15 ends all processing in the flowchart illustrated in FIG. 3.

In contrast, if the controller 15 advances the process to step S13 due to determining that there do exist capacitive sensors that detected capacitance values equal to or greater than the direct touch threshold level, the controller 15 functions as the read controller 19 and compares the acquire capacitance values to the direct touch threshold level stored in the threshold level memory 18. In so doing, the controller 15 creates two-dimensional coordinate information for the display unit 5 corresponding to the position and number of direct touches by the user (i.e., the number of fingers in a direct touch operation), and advances the process to step S14.

If two-dimensional coordinate information corresponding to a direct touch operation is created, the controller 15 functions as the touch driver 21 and stores the two-dimensional coordinate information corresponding to a direct touch operation in the storage area for direct touch operations in the operation history register 16.

Next, upon advancing the process to step S14, the controller 15 functions as the operation detector 26 of the window manager 23 and detects a direct touch operation mode (direct touch operation pattern) and a direct touch operation position on the basis of the two-dimensional coordinate information corresponding to the direct touch operation acquired when the controller 15 functioned as the touch driver 21, as well as two-dimensional coordinate information obtained during past direct touch operations being stored in the storage area for direct touch operations in the operation history register 16. The controller 15 then advances the process to step S15.

In step S15, the controller 15 functions as the application execution controller 24, controls execution of a process from among respective processes in the currently active application program that corresponds to the detected direct touch operation mode (direct touch operation pattern) and direct touch operation position, and advances the process to step S16.

In step S16, the controller 15 functions as the read controller 19 as discussed above and determines whether or not an application program is currently running. In so doing, the controller 15 determines whether or not to continue detecting capacitance values.

Then, in cases where it is determined that acquisition of capacitance values has been terminated, such as when an operation for ending the currently active application is performed, for example, the controller 15 ends all processing in the flowchart illustrated in FIG. 3.

Action During Second Control Mode

Next, if the controller 15 switches to the second control mode because a contactless operation mode file is attached to the activated application program, the controller 15 advances the process to step S2 and improves the sensitivity of the capacitive sensors in the display unit 5 by raising the output gain of the capacitive sensors by a given amount, for example. The controller 15 then advances the process to step S3.

In other words, since contactless operations are conducted in a state where an operating object is not made to contact the display unit 5, capacitance values detected by the capacitive sensors will be detected at lower values than those during direct touch operations. For this reason, upon switching to the second control mode, the controller 15 attempts to improve the sensitivity of the capacitive sensors by raising the output gain of the capacitive sensors by a given amount as discussed above, for example.

Thus, changes in capacitance values corresponding to contactless operations can be detected with high sensitivity, making it possible to accurately detect the contactless operation position, etc.

Next, in step S3, the controller 15 functions as the application execution controller 24 and reads the contactless operation mode file attached to the activated application program. Then, the controller 15 functions as the contactless operation enabler 25 and the contactless operation detector 20, loads the contactless operation mode file thus read into the contactless operation mode file memory 17, and advances the process to step S4.

The contactless operation mode file is a file of contactless operation mode data expressing capacitance map transition patterns for individual contactless operation modes used to specify execution of a desired process in the currently activated application program.

For this reason, by loading the contactless operation mode file into the contactless operation mode file memory 17, capacitance map transition patterns for individual contactless operation modes used to specify execution of a desired process in the currently activated application program become held in the contactless operation mode file memory 17.

In step S4, the controller 15 functions as the read controller 19 and thereby acquires the capacitance values of all capacitive sensors in the display unit 5 as a capacitance map, and then advances the process to step S5.

In step S5, the controller 15 compares the capacitance values in the acquired capacitance map to the direct touch threshold level indicated by the broken line in FIG. 4(a) which is stored in the threshold level memory 18. In so doing, the controller 15 determines whether or not there exist capacitance values from among the acquired capacitance values that are equal to or greater than the direct touch threshold level.

The existence of capacitance values equal to or greater than the direct touch threshold level among the capacitance values in the acquired capacitance map means that a direct touch operation has been performed by the user. For this reason, the controller 15 advances the process to step S6 and conducts processing for direct touch operations.

In other words, upon advancing the process to step S6, the controller 15 functions as the read controller 19 and compares the capacitance values in the acquired capacitance map to the direct touch threshold level stored in the threshold level memory 18. In so doing, the controller 15 creates two-dimensional coordinate information for the display unit 5 corresponding to the position and number of direct touches by the user (i.e., the number of fingers in a direct touch operation), and advances the process to step S7.

The controller 15 functions as the touch driver 21 and stores the two-dimensional coordinate information corresponding to the detected direct touch operation in the storage area for direct touch operations in the operation history register 16.

Next, upon advancing the process to step S7, the controller 15 functions as the operation detector 26 of the window manager 23 and detects a direct touch operation mode (direct touch operation pattern) and a direct touch operation position on the basis of the two-dimensional coordinate information corresponding to the direct touch operation acquired when the controller 15 functioned as the touch driver 21, as well as two-dimensional coordinate information obtained during past direct touch operations being stored in the storage area for direct touch operations in the operation history register 16. The controller 15 then advances the process to step S8.

In step S8, the controller 15 functions as the application execution controller 24, controls execution of a process from among respective processes in the currently active application program that corresponds to the detected direct touch operation mode (direct touch operation pattern) and direct touch operation position, and advances the process to step S9.

In step S9, the controller 15 functions as the read controller 19 as discussed above and determines whether or not an application program is currently running. In so doing, the controller 15 determines whether or not to continue detecting capacitance values.

Then, in cases where it is determined that acquisition of capacitance values has been terminated, such as when an operation for ending the currently active application is performed, for example, the controller 15 ends all processing in the flowchart illustrated in FIG. 3.

Meanwhile, in cases where it is determined to continue detecting capacitance values, such as when an application program is currently running, the controller 15 returns the process to step S4 and once again acquires the capacitance values of all capacitive sensors in the display unit. While an application program is running, the controller 15 controls repeated execution of action for acquiring the capacitance values of all capacitive sensors in this way at given time intervals.

Meanwhile, in step S5, a lack of capacitance values equal to or greater than the direct touch threshold level among the capacitance values in the acquired capacitance map means there is a possibility that a contactless operation has been performed by the user. For this reason, the controller 15 advances the process to step S10 in the case where the existence of capacitance values equal to or greater than the direct touch threshold level is not detected.

Figure 4B:
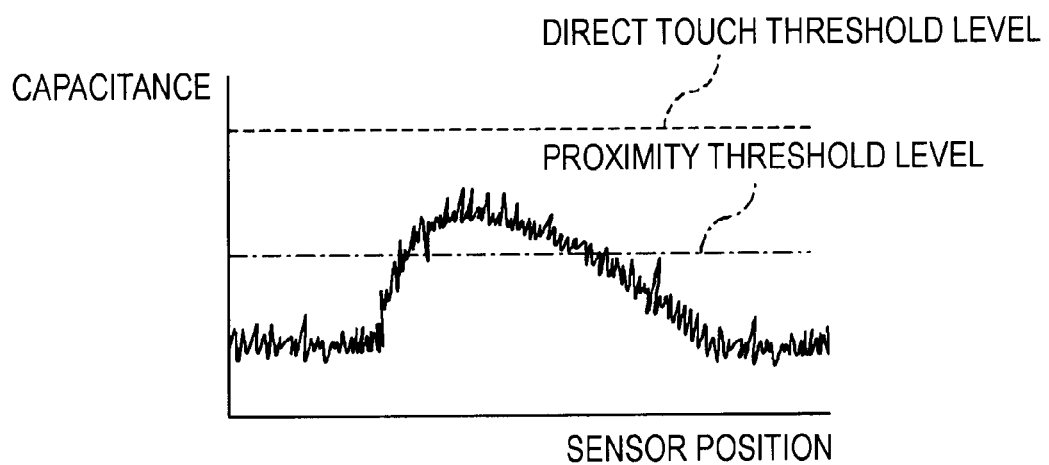

In step S10, the controller 15 functions as the read controller 19 and compares the acquired capacitance values to the contactless threshold level indicated by the chain line in FIG. 4(b) which is stored in the threshold level memory 18. In so doing, the controller 15 determines whether or not there exist capacitance values among the acquired capacitance values which are equal to or greater than the contactless threshold level.

In the case where capacitance values equal to or greater than the contactless threshold level does not exist, the controller 15 discards the acquired capacitance values by treating them as noise, returns the process to step S4 via step S9, and once again acquires the capacitance values of all capacitive sensors in the display unit 5.

Figure 4C:
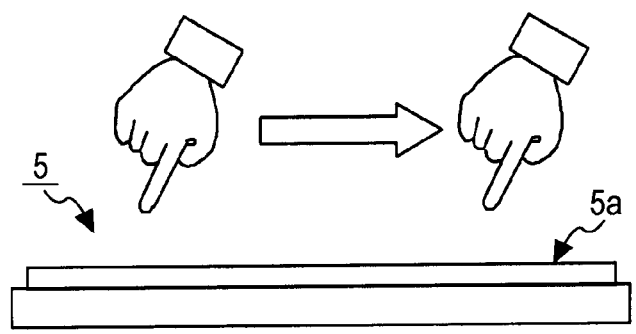

In contrast, the existence of capacitance values equal to or greater than the contactless threshold level means that a contactless operation like that illustrated in FIG. 4(c), for example, has been performed by the user. For this reason, the controller 15 advances the process to step S31 in FIG. 7.

At this point, the respective processing in step S5 and step S10 will be once again explained in detail.

Exemplary capacitance values for all capacitive sensors detected during a direct touch operation are illustrated in FIG. 5. During a direct touch operation, only the capacitance value of the sensor where the direct touch operation is centered and the capacitance values of the immediately adjacent sensors are detected as large capacitance values, as indicated by being enclosed in bold lines in FIG. 5.

Exemplary capacitance values for all capacitive sensors detected during a contactless operation are illustrated in FIG.

6. During a contactless operation, capacitance values that have changed to intermediate values over a wider range than during a direct touch operation are detected, as indicated by being enclosed in bold lines in FIG. 6.

In the case of the mobile phone in this embodiment, there are a total of two threshold levels: a direct touch threshold level indicated by the broken line in FIGS. 4(*a*) and 4(*b*), and a contactless threshold level indicated by the chain line in FIGS. 4(*a*) and 4(*b*), which is set at a lower level than the level of the direct touch threshold level.

Upon acquiring all capacitance values from the display unit 5, in step S5 the controller 15 compares the capacitance values of respective sensors in the acquired capacitance map to the direct touch threshold level indicated by the broken line in FIGS. 4(*a*) and 4(*b*). Then, the controller 15 determines whether or not there exist capacitance values among the capacitance values from all sensors in the display unit 5 which are equal to or greater than the direct touch threshold level.

The case where capacitance values equal to or greater than the direct touch threshold level do exist as illustrated in FIG. 4(*a*) means that a direct touch operation is being conducted on the display unit 5 by the user. For this reason, the controller 15 controls the storage of two-dimensional coordinate information corresponding to the detected direct touch operation in the storage area for direct touch operations in the operation history register 16.

In contrast, in the case where is it determined that capacitance values equal to or greater than the direct touch threshold level do not exist among the capacitance values from all sensors in the display unit 5, the controller 15 advances the process to step S10 and respectively compares the capacitance values of respective sensors in the acquired capacitance map to the contactless threshold level indicated by the chain line in FIGS. 4(*a*) and 4(*b*). Then, in this step S10, the controller 15 determines whether or not there exist capacitance values among the respective capacitance values detected by all sensors in the display unit 5 which are less than the direct touch threshold level but also equal to or greater than the contactless threshold level.

The existence of sensors having capacitance values which are lower than the direct touch threshold level but also equal to or greater than the contactless threshold level means that a contactless operation is being conducted on the display unit 5 by the user. For this reason, the controller 15 controls the storage of the acquired capacitance map in the storage area for contactless operations in the operation history register 16 and advances the process to step S31 of the flowchart in FIG. 7 hereinafter described.

When the controller 15 advances the process to step S31 of the flowchart in FIG. 7 due to determining in step S10 that there exist capacitance values among the capacitance values in the capacitance map acquired from the display unit 5 which are lower than the direct touch threshold level indicated by the broken line in FIG. 4(*b*) but also equal to or greater than the direct touch threshold level indicated by the chain line in FIG. 4(*b*), the controller 15 next functions as the contactless operation detector 20 and determines whether or not a given number or more capacitance maps are being stored in the storage area for contactless operations in the operation history register 16 such that a contactless operation pattern) can be detected.

The controller 15 then advances the process to step S32 in the case where it is determined that the given number or more capacitance maps are being stored, while advancing the process to step S9 of the flowchart in FIG. 3 in the case where it is determined that the given number or more capacitance maps are not being stored.

In the case of the mobile phone in this embodiment, capacitance maps are acquired from the display unit 5 at given time intervals while an application program is running, as discussed above. For this reason, upon advancing the process to step S9 of the flowchart in FIG. 3 due to determining that the given number or more capacitance maps are not being stored, the controller 15 determines whether or not to continue detecting capacitance maps by determining whether or not an application program is currently running.

Then, in the case where it is determined that acquisition of the next capacitance map has terminated, such when an operation for ending the currently active application program is given, for example, the controller 15 ends all processing in the respective flowcharts illustrated in FIGS. 3 and 7.

In contrast, if the controller 15 determines to continue detecting capacitance maps, the controller 15 returns the process to step S4 and from the display unit 5 acquires a capacitance map expressing the capacitance values of all capacitive sensors in the display unit 5 as discussed earlier. Then, if there exist capacitance values among the capacitance values in the acquired capacitance map which are lower than the direct touch threshold level but also equal to or greater than the contactless threshold level, the controller 15 controls storage of the capacitance map in the storage area for direct contactless operations in the operation history register 16.

In this way, in the case where a number of capacitance maps enabling detection of a contactless operation pattern (contactless operation mode) or more are not being stored in the operation history register 16 while an application program is running, the controller 15 returns the process to step S4 via step S9 of the flowchart in FIG. 3, and once again acquires a capacitance map and controls its storage in the storage area for contactless operations in the operation history register 16. In so doing, capacitance maps corresponding to a contactless operation are successively stored in the storage area for contactless operations in the operation history register 16.

At this point, in the case where the activated application program does support contactless operations, the controller 15 is configured to load contactless operation mode data, which indicates capacitance map transition patterns for individual contactless operation modes of contactless operations used by the application program, into the contactless operation mode file memory 17 as the contactless operation mode file, as discussed earlier.

For this reason, upon advancing the process to step S32 due to determining that a number of capacitance maps enabling detection of a contactless operation mode are being stored in the storage area for contactless operations in the operation history register 16, the controller 15 functions as the contactless operation detector 20 to specify for each capacitance map the placement positions on the display unit 5 of the capacitive sensors that detected capacitance values which are lower than the direct touch threshold level but also equal to or greater than the contactless threshold level, on the basis of the respective capacitance maps stored in the operation history register 16. Then, the controller 15 detects shifts in the capacitive sensors specified for the individual capacitance maps as a capacitance map transition pattern corresponding to a contactless operation.

Figures 8A, 8B, 8C:
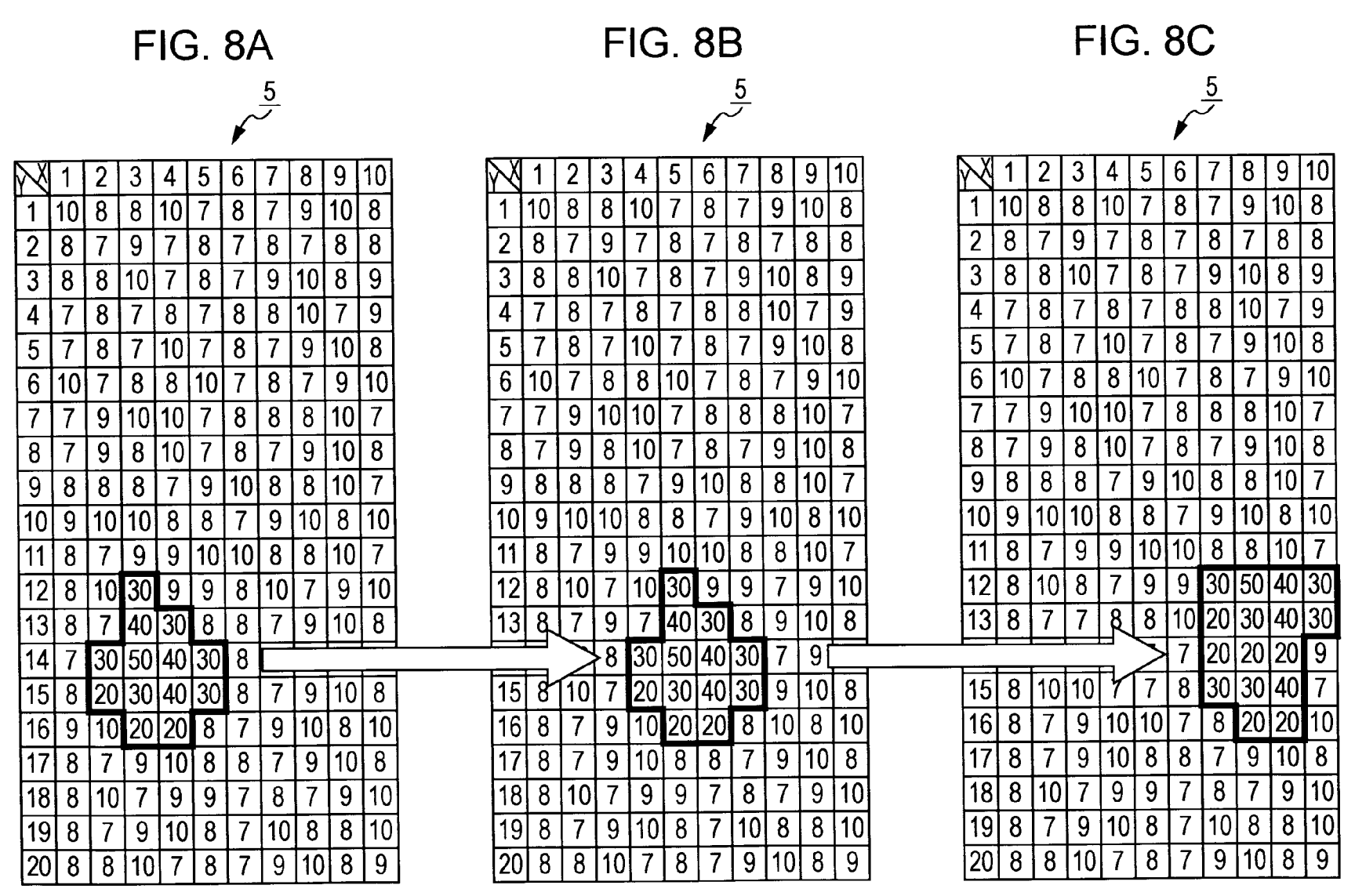

An exemplary transition pattern across respective capacitance maps during a contactless operation is illustrated in FIGS. 8(a) to 8(c). The example illustrated in FIGS. 8(a) to 8(c) is an example for the case where a contactless operation is made on the display unit 5 of a mobile phone from left to right along the short axis of the display unit 5.

In the case where such a contactless operation is conducted, the positions of the capacitive sensors that detect capacitance values equal to or greater than the contactless threshold level move from left to right along the short axis of the display unit 5, as indicated by being respectively enclosed in bold lines in FIGS. 8(a) to 8(c).

In step S32, the controller 15 detects the shift in the positions of the capacitive sensors that detect capacitance values equal to or greater than the contactless threshold level due to such a contactless operation as a capacitance map transition pattern corresponding to a contactless operation.

Next, the controller 15 advances the process to step S33 and functions as the contactless operation detector 20 to compare the capacitance map transition pattern detected with respect to a contactless operation in step S32 to capacitance map transition patterns expressed by contactless operation mode data in a contactless operation mode file loaded into the contactless operation mode file memory 17, and specify a contactless operation mode (contactless operation gesture). Then, the controller 15 detects two-dimensional coordinate information corresponding to the specified contactless operation.

In other words, during a direct touch operation, capacitance values change over an extremely tight area on the display unit 5, as illustrated in FIG. 5. For this reason, two-dimensional coordinates on the display unit 5 corresponding to a direct touch operation can also be accurately detected.

In contrast, during a contactless operation, capacitance values change over a wider area than during a direct touch operation, as illustrated in FIG. 6 and FIGS. 8(a) to 8(c). For this reason, it is difficult to accurately detect two-dimensional coordinates on the display unit 5 corresponding to a contactless operation.

For this reason, in the case of the mobile phone in this embodiment, contactless operation mode data in a contactless operation mode file is made up of data expressing contactless operation modes (gestures) corresponding to capacitance map transition patterns such as "right-to-left", "left-to-right", "top-to-bottom", and "bottom-to-top", as well as data expressing two-dimensional coordinates corresponding to contactless operation modes.

Stated differently, since it is difficult to accurately detect two-dimensional coordinates on the display unit 5 corresponding to a contactless operation position, individual capacitance map transition patterns and individual contactless operation modes are associated with each other in advance, while in addition, two-dimensional coordinates for specifying processes in an application program are respectively associated with the individual contactless operation modes. The result is taken to be the contactless operation mode data.

In step S33, the controller 15 detects from the contactless operation mode file memory 17 the contactless operation mode data of a transition pattern that matches the capacitance map transition pattern detected with respect to a contactless operation. As discussed above, the contactless operation mode data is made up of data expressing contactless operation modes corresponding to capacitance map transition patterns, and data expressing two-dimensional coordinates corresponding to the contactless operation modes for specifying processes of the application program.

For this reason, by detecting from the contactless operation mode file memory 17 the contactless operation mode data of a transition pattern that matches a capacitance map transition pattern detected with respect to a contactless operation, the controller 15 detects a contactless operation mode and two-dimensional coordinates corresponding to this contactless operation mode.

Next, the controller 15 advances the process to step S34 and functions as the operation detector 26 to recognize a contactless operation mode and two-dimensional coordinate information corresponding to this contactless operation mode.

Then, in step S34, the controller 15 functions as the application execution controller 24 to control execution of a process in an application program on the basis of the recognized contactless operation mode and two-dimensional coordinate information corresponding to this contactless operation mode.

In so doing, execution of the process that corresponds to the user's contactless operation from among the various processes in the currently active application program is controlled by the controller 15 on the basis of the currently active application program.

Upon controlling execution of a process in an application program corresponding to a contactless operation in this way, the controller 15 advances the process to step S9 in FIG. 3 and determines whether or not to continue detecting capacitance maps by determining whether or not an application program is currently running, as discussed earlier.

Then, if the controller 15 determines to continue detecting capacitance maps, the controller 15 returns the process to step S4 and acquires from the display unit 5 a capacitance map expressing the capacitance values of all sensors on the display unit 5, as discussed earlier.

In contrast, if the controller 15 determines that acquisition of the next capacitance map has terminated, such when an operation for ending the currently active application program is given, for example, the controller 15 ends all processing in the respective flowcharts illustrated in FIGS. 3 and 7.

Advantages of Embodiment

As the foregoing explanation demonstrates, the mobile phone in this embodiment is provided with a display unit 5 which forms a capacitive touch panel, and in addition, a direct touch threshold level as well as a contactless threshold level are set. Furthermore, two-dimensional coordinate information expressing a direct touch operation position is created on the basis of the capacitance values of the respective sensors in the display unit 5 during a direct touch operation and the direct touch threshold level, and the execution of information processing corresponding to the created two-dimensional coordinate information expressing a direct touch operation position from among various information processing in the currently active application program is controlled.

Also, two-dimensional coordinate information expressing a contactless operation mode is created on the basis of the capacitance values of the respective sensors in the display unit 5 during a contactless operation and the contactless threshold level, and the execution of information processing corresponding to the created two-dimensional coordinate information expressing a contactless operation mode from among various information processing in the currently active application program is controlled.

In so doing, information processing based on a given application program can be made operable by contactless operations, and new operational modes for application programs can be provided.

Information Processing Action by Various Application Programs

Hereinafter, exemplary information processing action by various application programs in a mobile phone of this embodiment will be described.

Information Processing Action by a Telephone Application Program (Information Processing Action According to a Contactless Operation)

Figure 9:
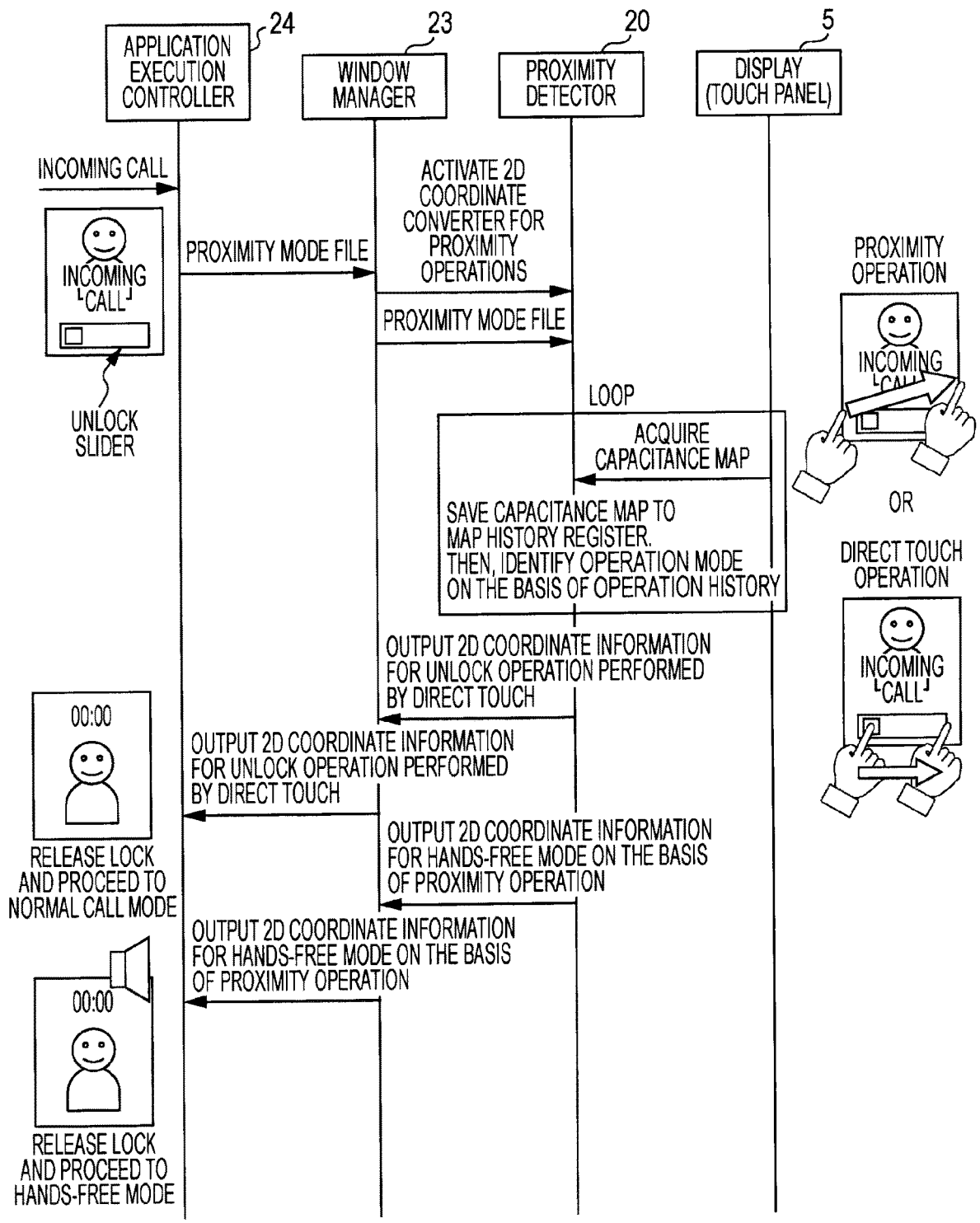
FIG. 9 is a timing chart for explaining information processing of a telephony application conducted by a direct touch operation and a contactless operation in a mobile phone according to an embodiment.
Figure 10:
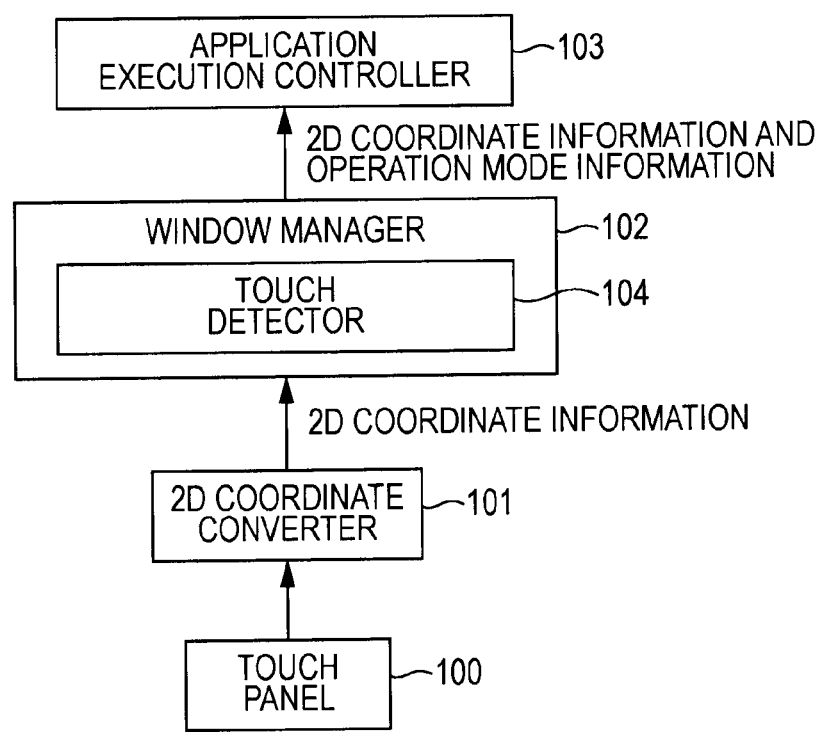
FIG. 10 is a function block diagram during input processing by a controller in a conventional mobile phone.
Figure 11:
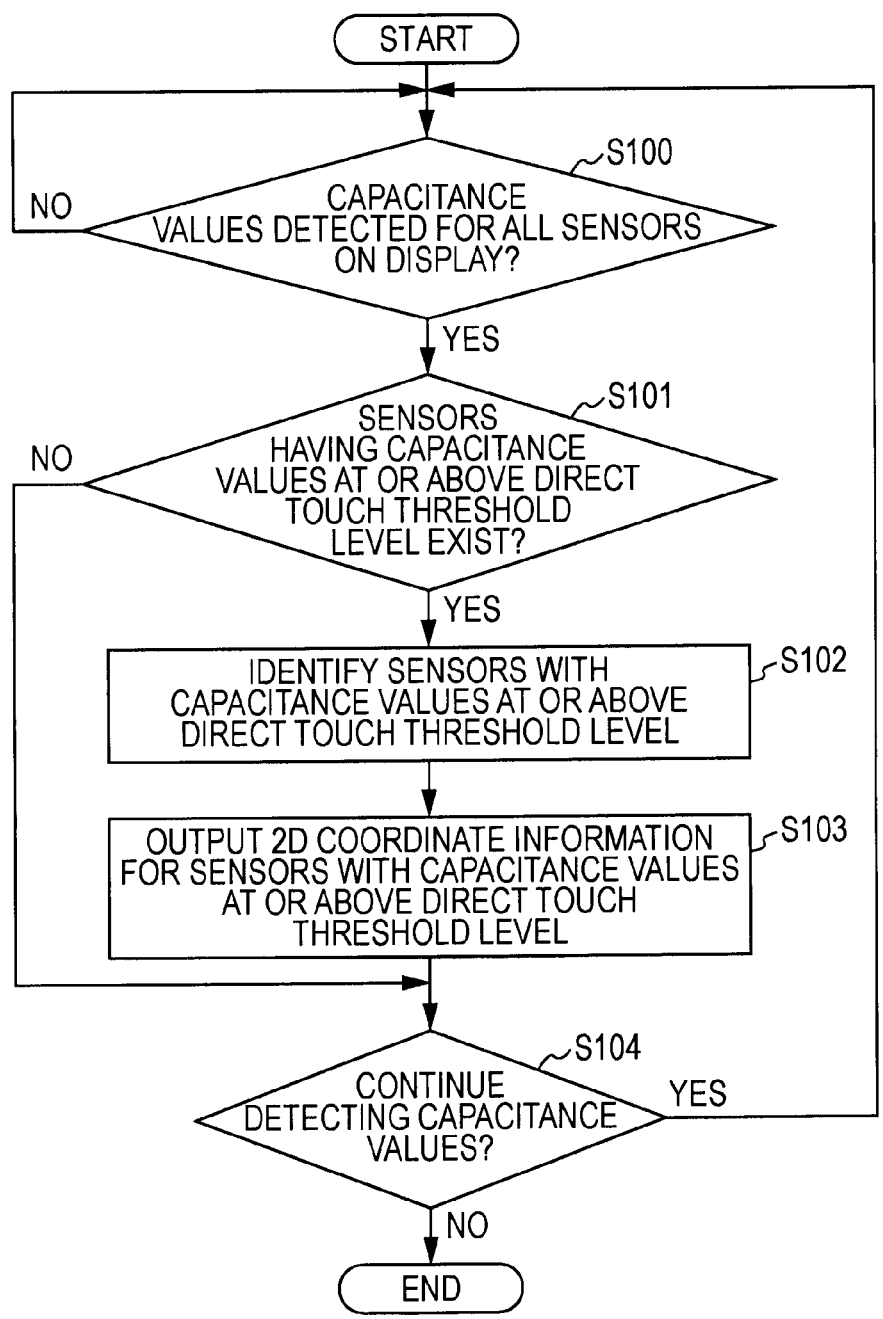
FIG. 11 is a flowchart illustrating input processing action in a conventional mobile phone.
Figure 12A:
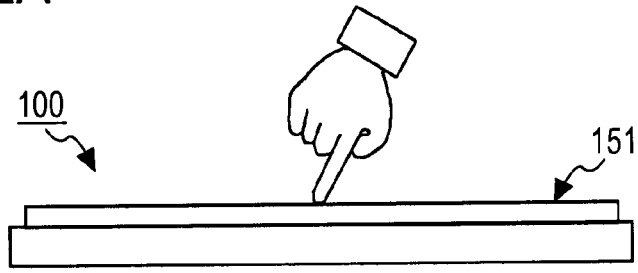
FIGS. 12A, 12B and 12C are diagrams for explaining a direct touch threshold level provided in a conventional mobile phone.
Figure 12B:
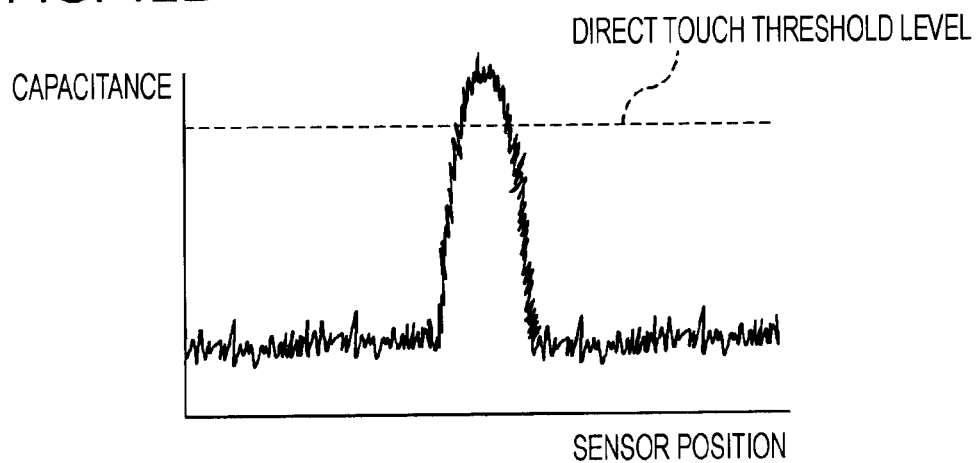
Figure 12C:
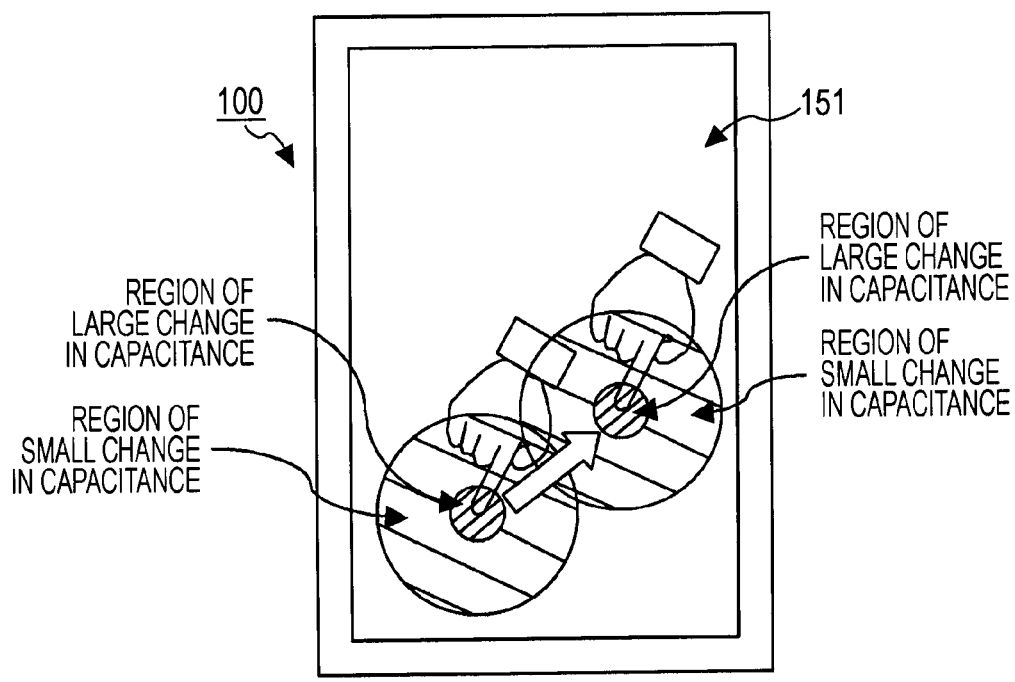

First, a mobile phone of this embodiment is configured to switch to what is called a hands-free telephony mode if a contactless operation is conducted so as to horizontally swipe a finger across the display unit 5 as illustrated in FIG. 9 in the case where an incoming telephone call or an incoming video phone call is received while the mobile phone is in a locked mode that cancels most operations.

Specifically, if an incoming telephone call or an incoming video phone call is received while in the locked mode, the controller 15 functions as the contactless operation enabler 25 to load a contactless operation mode file of contactless operation mode data expressing contactless operation modes (gestures) of contactless operations and two-dimensional coordinates corresponding to the contactless operation modes used by a telephone application program into the contactless operation mode file memory 17.

Also, the controller 15 acquires the capacitance maps discussed earlier from the display unit 5 and controls their successive storage in the operation history register 16.

Next, the controller 15 compares the transition pattern of the capacitance maps stored in the operation history register 16 to the capacitance map transition patterns for individual contactless operation modes expressed by the respective contactless operation mode files loaded into the contactless operation mode file memory 17. Then, the controller 15 detects contactless operation mode data expressing a transition pattern matching the transition pattern of the respective capacitance maps acquired from the operation history register 16 from among the capacitance map transition patterns for individual contactless operation modes expressed by the respective contactless operation mode data stored in the contactless operation mode file memory 17.

The contactless operation mode data expresses a contactless operation pattern corresponding to a transition pattern of the respective capacitance maps, and two-dimensional coordinate information corresponding to this contactless operation pattern. The controller 15 functions as the operation detector 26 of the window manager 23 to detect a contactless operation pattern and two-dimensional coordinate information corresponding to this contactless operation pattern on the basis of the detected contactless operation mode data.

The detected contactless operation pattern is for a contactless operation instructing the switch to a hands-free telephony mode in the case of a contactless operation pattern wherein a finger is moved so as to horizontally swipe across the display unit 5. Thus, the controller 15 functions as the application execution controller 24 to switch to a hands-free telephony mode on the basis of a telephone application program, and controls driving of the microphone unit 4 which picks up telephone transmitter audio and the second speaker unit 3b, which is an external speaker unit for obtaining the acoustic output of telephone receiver audio, while also controlling communication by the communication circuit 2 so as to transmit and receive telephony audio obtained thereby.

Similarly, in the case of detecting the above-discussed contactless operation wherein a finger is moved so as to horizontally swipe across the display unit 5 when an incoming video phone call is received, the controller 15 switches to a hands-free telephony mode on the basis of a video phone application program, and controls driving of the microphone unit 4 which picks up telephone transmitter audio, the second speaker unit 3b, which is an external speaker unit for obtaining the acoustic output of telephone receiver audio, the second camera unit 8b for obtaining transmitter images, and the display unit 5 for displaying receiver images, while also controlling communication by the communication circuit 2 so as to transmit and receive telephony audio and images obtained thereby.

Thus, when an incoming telephone call or an incoming video phone call is received, telephone or video phone communication in what is called a hands-free telephony mode can be made possible simply by conducting a contactless operation so as to horizontally swipe a finger across the display unit 5.

(Information Processing Action According to a Direct Touch Operation)

Next, a mobile phone of this embodiment is configured such that if a direct touch operation is conducted so as to slide an unlock slider displayed on the display unit 5 in an unlock direction as illustrated in FIG. 9 in the case where an incoming telephone call is received while in the locked mode, the mobile phone recognizes that an off-hook operation has been performed, cancels the locked mode, and switches to a normal telephony mode that conducts telephony using the first speaker unit 3a and the microphone unit 4.

Specifically, if the controller 15 detects a direct touch operation that slides the unlock slider in the unlock direction on the basis of a transition pattern of respective capacitance maps stored in the operation history register 16 as discussed earlier in the case where an incoming telephone call is received while in the locked mode, the controller 15 controls the driving of the first speaker unit 3a, which is an internal speaker unit, and the microphone unit 4, and switches to a normal telephony mode.

Thus, if a direct touch operation that slides an unlock slider in the unlock direction is conducted when an incoming telephone call is received, the lock is released and telephony can be conducted in a normal telephony state.

(Other Information Processing Action According to a Direct Touch Operation)

Next, a mobile phone of this embodiment is configured such that if a direct touch operation is conducted so as to slide an unlock slider displayed on the display unit 5 in an unlock direction as illustrated in FIG. 9 in the case where an incoming video phone call is received while in the locked mode, the mobile phone cancels the locked mode and switches to a hands-free telephony mode.

Specifically, if the controller 15 detects a direct touch operation that slides an unlock slider displayed on the display unit 5 in an unlock direction on the basis of a transition pattern of respective capacitance maps stored in the operation history register 16 as discussed earlier in the case where an incoming video phone call is received while in the locked mode, the controller 15 cancels the locked mode while also switching to a hands-free telephony mode on the basis of a video phone application program.

Then, the controller 15 controls driving of the microphone unit 4 which picks up telephone transmitter audio, the second speaker unit 3*b*, which is an external speaker unit for obtaining the acoustic output of telephone receiver audio, the second camera unit 8*b* for obtaining transmitter images, and the display unit 5 for displaying receiver images, while also controlling communication by the communication circuit 2 so as to transmit and receive telephony audio and images obtained thereby.

Thus, when an incoming video phone call is received, video phone communication in what is called a hands-free telephony mode can be made possible simply by conducting a direct touch operation that slides an unlock slider displayed on the display unit 5 in an unlock direction.

Information Processing Action of an Email Management Program According to a Contactless Operation Next, if an email is received, the controller 15 activates an email management program stored in the memory 14 and notifies the user of the receipt of the email.

In this example, when the email management program is activated, a contactless operation that horizontally swipes a finger across the display unit 5 becomes a contactless operation instructing display of the body text of the received email.

For this reason, when the controller 15 detects a contactless operation that horizontally swipes a finger across the display unit 5 on the basis of the created two-dimensional coordinate information while functioning as the window manager 23, the controller 15 controls display of the body text of the received email on the display unit 5 in accordance with the contactless operation.

Also, in this example, when the email management program is activated, a contactless operation that moves a finger up or down along the long axis of the display unit 5 becomes a contactless operation instructing scrolling of the body text of the displayed email.

For this reason, when the controller 15 detects a contactless operation that moves a finger over the display unit 5 along the long axis of the display unit 5 on the basis of the created two-dimensional coordinate information while functioning as the window manager 23, the controller 15 scrolls the body text of the email being displayed in accordance with the contactless operation.

Thus, when an email is received, the body text of the received email can be displayed on the display unit 5 simply by conducting a contactless operation so as to horizontally swipe a finger across the display unit 5. Also, when the body text of an email is being displayed on the display unit 5, by simply conducting a contactless operation that moves a finger over the display unit 5 along the long axis of the display unit 5, the body text of the displayed email can be scrolled in accordance with the contactless operation along the long axis of the display unit 5.

Information Processing Action of a Lock/Unlock Application Program According to a Contactless Operation Next, if a given hardware key 6 is operated, the controller 15 switches to a locked mode that cancels most key operations on the basis of a lock/unlock application program stored in the memory 14.

During such a locked mode, a contactless operation that horizontally swipes a finger across the display unit 5 becomes a contactless operation instructing the mobile phone to accept a key operation and switch from the locked mode to an unlocked mode which conducts information processing corresponding to the key operation.

Also, during the unlocked mode, a contactless operation that horizontally swipes a finger across the display unit 5 becomes a contactless operation instructing the mobile phone to switch from the unlocked mode to a locked mode which cancels most key operations.

Also, during the locked mode, a direct touch operation that slides an unlock slider on the display unit 5 in an unlock direction becomes a direct touch operation instructing the mobile phone to switch from the locked mode to the unlocked mode.

Also, during the unlocked mode, a direct touch operation that slides an unlock slider on the display unit 5 in a lock direction becomes a direct touch operation instructing the mobile phone to switch from the unlocked mode to the locked mode.

During the locked mode, if the controller 15 detects a contactless operation that horizontally swipes a finger across the display unit 5 on the basis of the created two-dimensional coordinate information while functioning as the window manager 23, the controller 15 switches to the unlocked mode in accordance with the contactless operation, accepts a key operation by the user, and controls execution of information processing corresponding to the key operation.

Also, during the unlocked mode, if the controller 15 detects a contactless operation that horizontally swipes a finger across the display unit 5 on the basis of the created two-dimensional coordinate information while functioning as the window manager 23, the controller 15 switches to the locked mode and cancels most key operations.

Thus, during a locked mode, the mobile phone can be switched to an unlocked mode simply by conducting a contactless operation that horizontally swipes a finger across the display unit 5, while during an unlocked mode, the mobile phone can be switched to a locked mode simply by conducting a contactless operation that horizontally swipes a finger across the display unit 5.

Also, during the locked mode, if the controller 15 detects a direct touch operation that slides an unlock slider on the display unit 5 in an unlock direction on the basis of the created two-dimensional coordinate information while functioning as the window manager 23, the controller 15 switches to an unlocked mode in accordance with the direct touch operation, accepts a key operation by the user, and controls execution of information processing corresponding to the key operation.

Also, during the unlocked mode, if the controller 15 detects a direct touch operation that slides an unlock slider on the display unit 5 in a lock direction on the basis of the created two-dimensional coordinate information while functioning as the window manager 23, the controller 15 switches to a locked mode and cancels most key operations.

Thus, during a locked mode, the mobile phone can be switched to an unlocked mode simply by conducting a direct touch operation that slides an unlock slider on the display unit 5 in an unlock direction, while during an unlocked mode, the mobile phone can be switched to a locked mode simply by conducting a direct touch operation that slides an unlock slider on the display unit 5 in a lock direction.

Information Processing Action of a Web Browsing Program According to a Contactless Operation Next, in the case where a given web page is being displayed on the display unit 5 on the basis of a web browsing program stored in the memory 14, a contactless operation that causes a finger to revolve in a clockwise direction over the display unit 5 becomes a contactless operation instructing the mobile phone to enlarge the web page being displayed.

Also, in the above case where a web page is being displayed on the display unit 5, a contactless operation that causes a finger to revolve in a counter-clockwise direction over the display unit 5 becomes a contactless operation instructing the mobile phone to reduce the web page being displayed.

Also, in the above case where a web page is being displayed on the display unit 5, a contactless operation that moves a finger over the display unit 5 upwards along the long axis of the display unit 5 becomes a contactless operation instructing the mobile phone to scroll up the web page being displayed.

Also, in the above case where a web page is being displayed on the display unit 5, a contactless operation that moves a finger over the display unit 5 downwards along the long axis of the display unit 5 becomes a contactless operation instructing the mobile phone to scroll down the web page being displayed.

For this reason, if the controller 15 detects a contactless operation that causes a finger over the display unit 5 to revolve in a clockwise direction on the basis of the created two-dimensional coordinate information while functioning as the window manager 23, the controller 15 enlarges the web page being displayed at gradually larger display magnifications in accordance with the contactless operation.

Also, if the controller 15 detects a contactless operation that causes a finger over the display unit 5 to revolve in a counter-clockwise direction on the basis of the created two-dimensional coordinate information while functioning as the window manager 23, the controller 15 reduces the web page being displayed at gradually smaller display magnifications in accordance with the contactless operation.

Also, if the controller 15 detects a contactless operation that moves a finger over the display unit 5 upwards along the long axis of the display unit 5 on the basis of the created two-dimensional coordinate information while functioning as the window manager 23, the controller 15 scrolls up the web page being displayed in accordance with the contactless operation.

Also, if the controller 15 detects a contactless operation that moves a finger over the display unit 5 downwards along the long axis of the display unit 5 on the basis of the created two-dimensional coordinate information while functioning as the window manager 23, the controller 15 scrolls down the web page being displayed in accordance with the contactless operation.

Thus, when a web page is being displayed, the web page can be enlarged or reduced by conducting a contactless operation that causes a finger over the display unit 5 to revolve in a clockwise or counter-clockwise direction.

Also, when a web page is being displayed, the web page can be scrolled up or scrolled down by conducting a contactless operation that moves a finger over the display unit 5 upwards or downwards along the long axis of the display unit 5.

Modifications

In the foregoing embodiment, the mobile phone is configured to detect both contactless operations and direct touch operations, but the mobile phone may also detect only contactless operations and control execution of information processing in application program on the basis of detected contactless operations. Even in such cases, the same advantages as discussed above can be obtained.

Although the foregoing embodiment was an example wherein the present invention was applied to a mobile phone, the present invention may also be applied to other electronic devices besides a mobile phone, such as a PHS phone (PHS: Personal Handyphone System), a PDA (PDA: Personal Digital Assistant), a digital camera, a digital video camera, a portable game console, or a notebook computer, for example. Moreover, the same advantages as those of the foregoing embodiment can still be obtained in any case.

Lastly, the foregoing embodiment is one example of the present invention. Accordingly, the present invention is not limited to the foregoing embodiment, and various modifications, combinations, and other embodiment may occur depending on design or other factors while remaining within the scope of the claims of the present invention or their equivalents. This is naturally understood by those skilled in the art.

REFERENCE SIGNS LIST

1: antenna
2: communication circuit
3a: first speaker unit
3b: second speaker unit
4: microphone unit
5: touch panel display unit
6: hardware keys
7: light emitter (LED: Light Emitting Diode)
8a: first camera unit
8b: second camera unit
9: vibration unit
10: timer
11: acceleration sensor
12: GPS antenna
13: GPS unit
14: memory
15: controller
16: operation history register
17: contactless operation mode file memory

The invention claimed is:

1. An information processing apparatus comprising:
a display;
a sensor that detects a contactless operation of an operation element over the display; and
circuitry configured to
control an application based on contactless operations detected at the sensor in a case where the application supports contactless operations, wherein the application is a web browsing program instructing the circuitry to control the display to display a web page, and
control the display to scroll up the web page in a case where the sensor detects a contactless operation indicating upward scrolling, and control the display to scroll down the web page in a case where the sensor detects a contactless operation indicating downward scrolling, wherein
the circuitry is further configured to
receive electrostatic capacitance values output by the sensor,
compare the electrostatic capacitance values to a first predetermined threshold value,
compare the electrostatic capacitance values to a second predetermined threshold value, the first predetermined threshold value being greater than the second predetermined threshold value,
determine that an operation received at the sensor is a contactless operation when at least one of the electrostatic capacitance values is less than the first predetermined threshold and greater than or equal to the second predetermined threshold value, obtain two-dimensional coordinate values corresponding to positions on the sensor at which the electrostatic capacitance values output by the sensor are less than the first predetermined threshold and greater than or equal to the second predetermined threshold value, detect a transition pattern of the two-dimensional coordinate values, and control execution of a process of the application based on the detected transition pattern of the obtained two-dimensional coordinate values.

2. The information processing apparatus of claim 1, wherein the sensor is a projection-type electrostatic-capacitance touch panel.

3. The information processing apparatus of claim 1, wherein the sensor is a touch panel that includes a substrate layer including an insulator film, an electrode layer arranged below the insulator film, and a control integrated circuit.

4. The information processing apparatus of claim 3, wherein the touch panel includes two layers of transparent electrodes in the electrode layer.

5. The information processing apparatus of claim 1, wherein the circuitry is configured to increase a sensitivity of the sensor when it is determined that the application supports contactless operations.

6. The information processing apparatus of claim 1, wherein the circuitry is configured to determine that an operation received at the sensor is a contact operation when at least one of the electrostatic capacitance values is greater than or equal to the first predetermined threshold value.

7. The information processing apparatus of claim 1, wherein the circuitry is configured to detect two-dimensional coordinate information corresponding to positions on the sensor at which the electrostatic capacitance values are greater than or equal to the first predetermined threshold value and control execution of the process of the application based on the two dimensional coordinate information when it is determined that the application does not support contactless operations.

8. The information processing apparatus of claim 1, wherein the circuitry is configured to detect two-dimensional coordinate information corresponding to positions on the sensor at which the electrostatic capacitance values are greater than or equal to the first predetermined threshold value and control execution of the process of the application based on the two dimensional coordinate information when it is determined that the application supports contactless operations.

9. The information processing apparatus of claim 1, wherein the circuitry is configured to control a telephone application to perform an off-hook operation when an incoming telephone call is received and a contactless operation is detected at the sensor.

10. The information processing apparatus of claim 1, wherein the circuitry is configured to control a videophone application to perform an off-hook operation when an incoming videophone call is received and a contactless operation is detected at the sensor.

11. The information processing apparatus of claim 1, wherein the circuitry is configured to control an electronic messaging application to display a received electronic message when a first contactless operation is detected at the sensor, and the circuitry is configured to control the electronic messaging application to scroll the displayed received electronic message when a second contactless operation is detected at the sensor.

12. The information processing apparatus of claim 1, wherein the circuitry is configured to control a lock/unlock application that locks/unlocks access to the information processing apparatus to switch from a locked mode to an unlock mode when a contactless operation is detected at the sensor.

13. The information processing apparatus of claim 1, wherein the circuitry is configured to control a display magnification application that controls a magnification level of information displayed by the information processing apparatus by increasing or decreasing a size of the information displayed by the information processing apparatus by a ratio corresponding to a contactless operation detected at the sensor.

14. The information processing apparatus of claim 1, wherein the circuitry is configured to determine whether an application activated at the information processing apparatus supports the contactless operations.

15. The information processing apparatus of claim 1, wherein the circuitry is configured to control execution of a process of the application of either the upward scrolling of the web page or the downward scrolling of the web page based on the detected transition pattern of the obtained two-dimensional coordinate values.

16. The information processing apparatus of claim 1, wherein the detected transition pattern of the obtained two-dimensional coordinate values is a pattern of moving from a first location in the display to a second location in the display.

17. The information processing apparatus of claim 16, wherein the first location and the second location are different.

18. An information processing method performed by an information processing apparatus including a display and a sensor that detects a contactless operation of an operation element over the display, the method comprising:

controlling, using circuitry, an application based on contactless operations detected at the sensor in a case where the application supports contactless operations, wherein the application is a web browsing program instructing the circuitry to control the display to display a web page;

controlling the display to scroll up the web page in a case where the sensor detects a contactless operation indicating upward scrolling; and controlling the display to scroll down the web page in a case where the sensor detects a contactless operation indicating downward scrolling, wherein the method further comprises receiving electrostatic capacitance values output by the sensor, comparing the electrostatic capacitance values to a first predetermined threshold value, comparing the electrostatic capacitance values to a second predetermined threshold value, the first predetermined threshold value being greater than the second predetermined threshold value, determining that an operation received at the sensor is a contactless operation when at least one of the electrostatic capacitance values is less than the first predetermined threshold and greater than or equal to the second predetermined threshold value, obtaining two-dimensional coordinate values corresponding to positions on the sensor at which the electrostatic capacitance values output by the sensor are less than the first predetermined threshold and greater than or equal to the second predetermined threshold value, detecting a transition pattern of the two-dimensional coordinate values, and controlling execution of a process of the application based on the detected transition pattern of the obtained two-dimensional coordinate values.

19. A non-transitory computer-readable medium including computer program instructions, which when executed by an information processing apparatus including a display and a sensor that detects a contactless operation of an operation element over the display, cause the information processing apparatus to perform a method, the method comprising:

controlling an application based on contactless operations detected at the sensor in a case where the application supports contactless operations, wherein the application is a web browsing program instructing the circuitry to control the display to display a web page;

controlling the display to scroll up the web page in a case where the sensor detects a contactless operation indicating upward scrolling; and controlling the display to scroll down the web page in a case where the sensor detects a contactless operation indicating downward scrolling, wherein the method further comprises receiving electrostatic capacitance values output by the sensor, comparing the electrostatic capacitance values to a first predetermined threshold value, comparing the electrostatic capacitance values to a second predetermined threshold value, the first predetermined threshold value being greater than the second predetermined threshold value, determining that an operation received at the sensor is a contactless operation when at least one of the electrostatic capacitance values is less than the first predetermined threshold and greater than or equal to the second predetermined threshold value, obtaining two-dimensional coordinate values corresponding to positions on the sensor at which the electrostatic capacitance values output by the sensor are less than the first predetermined threshold and greater than or equal to the second predetermined threshold value, detecting a transition pattern of the two-dimensional coordinate values, and controlling execution of a process of the application based on the detected transition pattern of the obtained two-dimensional coordinate values.

* * * * *